United States Patent [19]
Hayashi et al.

[11] Patent Number: 5,482,414
[45] Date of Patent: Jan. 9, 1996

[54] SLIDE COVER APPARATUS FOR MACHINE TOOL

[75] Inventors: Takehiko Hayashi; Ryuji Mizutani; Chusi Sugiyama, all of Toyota, Japan

[73] Assignees: Toyoda Koki Kabushiki Kaisha, Kariya; Kabushiki Kaisha Nakano Bankin, Toyota, both of Japan

[21] Appl. No.: 309,463

[22] Filed: Sep. 21, 1994

[30] Foreign Application Priority Data

Sep. 21, 1993 [JP] Japan ................................. 5-259067

[51] Int. Cl.⁶ .................................................. B73Q 11/08
[52] U.S. Cl. ................................ 409/134; 29/DIG. 56; 74/608; 160/116
[58] Field of Search .......................... 409/134; 483/3; 408/241 G, 710; 29/DIG. 86, DIG. 56, DIG. 59, DIG. 94; 74/608; 451/451; 160/116, 117, 118, 185, 186, 202, 220–224, 163–165, 180, 211, 194, 219, 218

[56] References Cited

U.S. PATENT DOCUMENTS

| | | | |
|---|---|---|---|
| 2,739,645 | 3/1956 | Urquhart | 160/185 |
| 3,926,242 | 12/1975 | Lowe | 160/118 X |
| 5,181,898 | 1/1993 | Piotroski | 483/3 |

FOREIGN PATENT DOCUMENTS

| | | | |
|---|---|---|---|
| 150171 | 8/1981 | Germany | 160/202 |
| 204873 | 12/1983 | Germany | 160/202 |
| 295107 | 12/1988 | Japan | |
| 2-15946 | 1/1990 | Japan | |
| 4-111746 | 4/1992 | Japan | |

Primary Examiner—William Briggs
Attorney, Agent, or Firm—Oblon, Spivak, McClelland, Maier, & Neustadt

[57] ABSTRACT

A slide cover apparatus for partitioning a machining head unit from a workpiece support unit comprises first and second cover assemblies. A main board and plural sub-boards of the first cover assembly are telescopically movable in a first horizontal direction, and the main board is formed with a vertically extending rectangular window. A center board and plural sub-boards of the second cover assembly which cover the rectangular window are guided by the main board for vertical movement. The main board is connected with a cross slide table of the machining head unit which is movable in the first horizontal direction, so as to be moved bodily by the cross slide table, while the center board is connected to be moved by a spindle head of the machining head unit. The spindle head on which a tool spindle is rotatably carried extending in a second horizontal direction perpendicular to the first horizontal direction is guided for vertical movement by a column, which is movable on said cross slide table in the second horizontal direction. The center board is formed with a tool-path hole which permits the tool spindle to pass therethrough, whereby the machining head unit is partitioned from the workpiece support unit except for the tool-path hole.

22 Claims, 22 Drawing Sheets

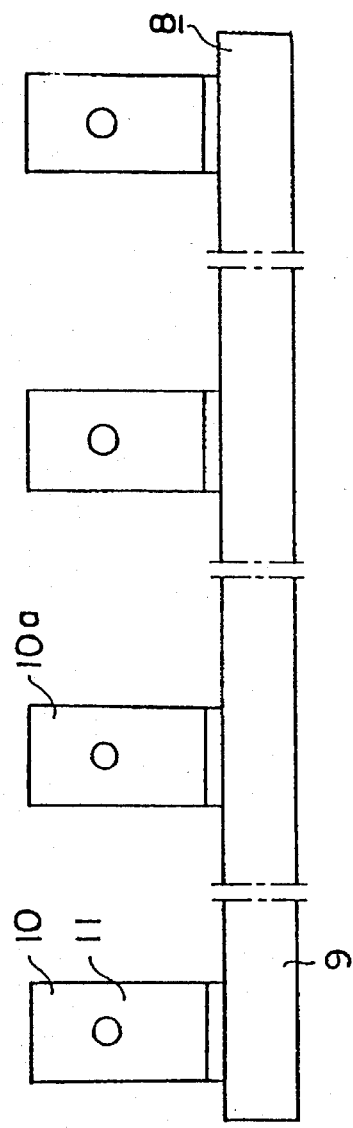
FIG. 6
FIG. 7
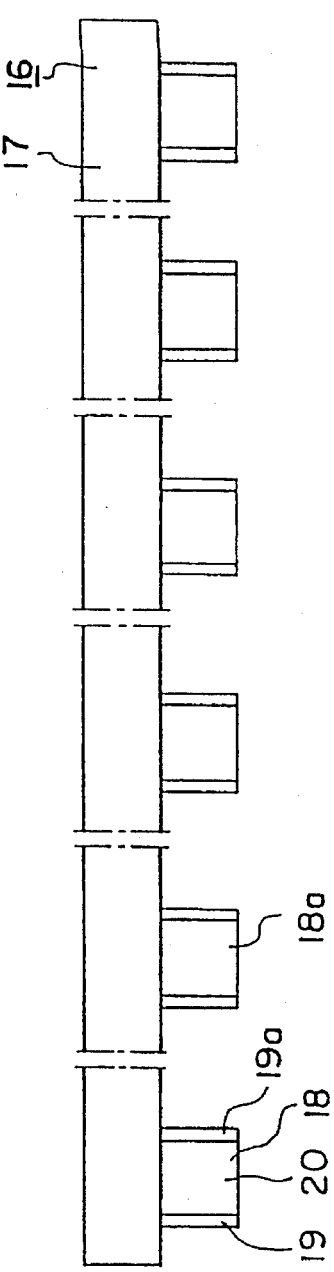
FIG. 8
FIG. 9

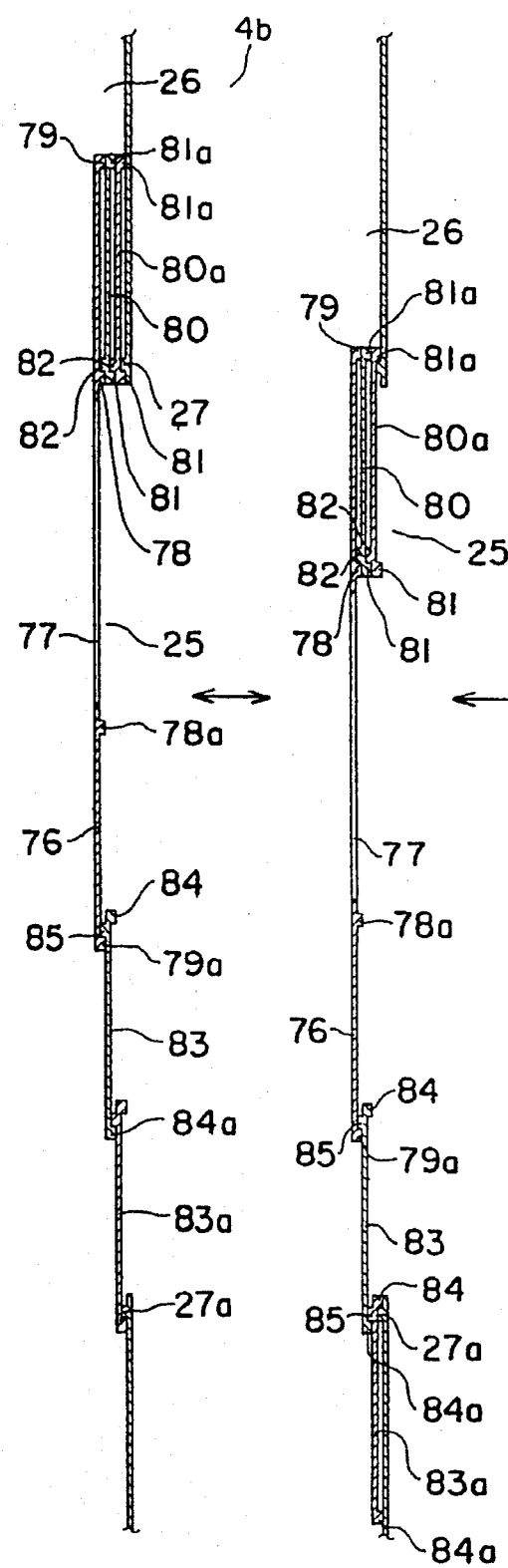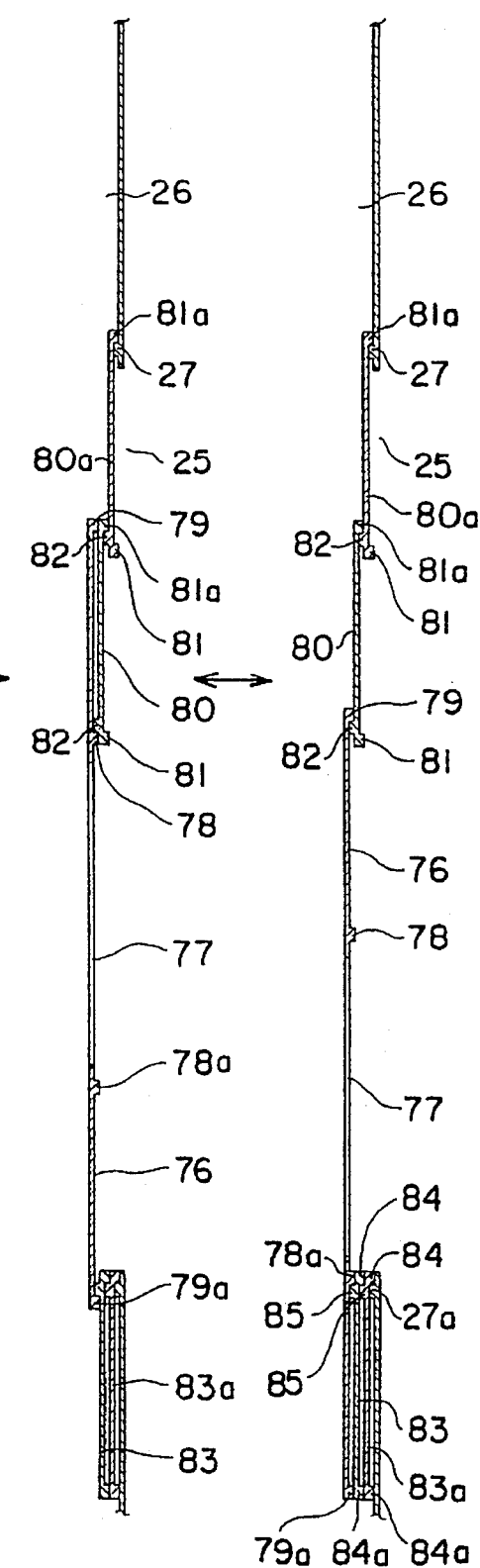

FIG. 39
FIG. 40
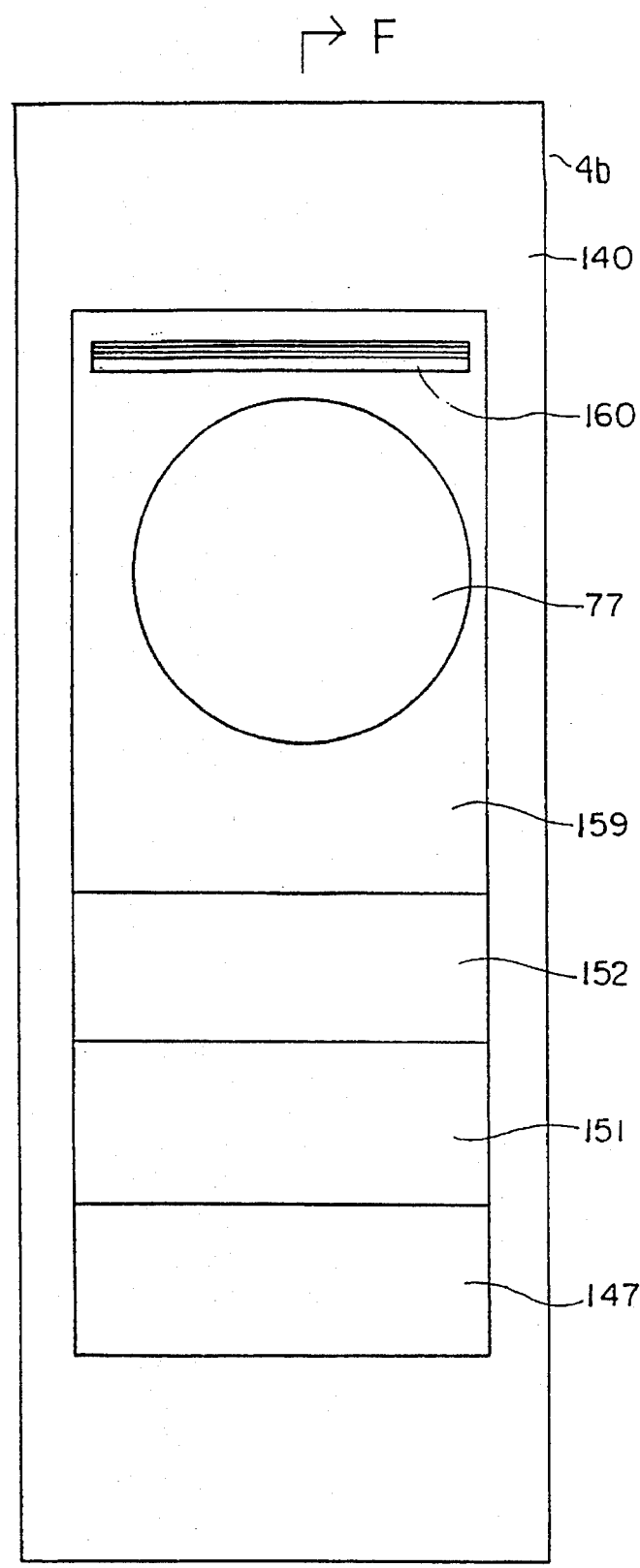
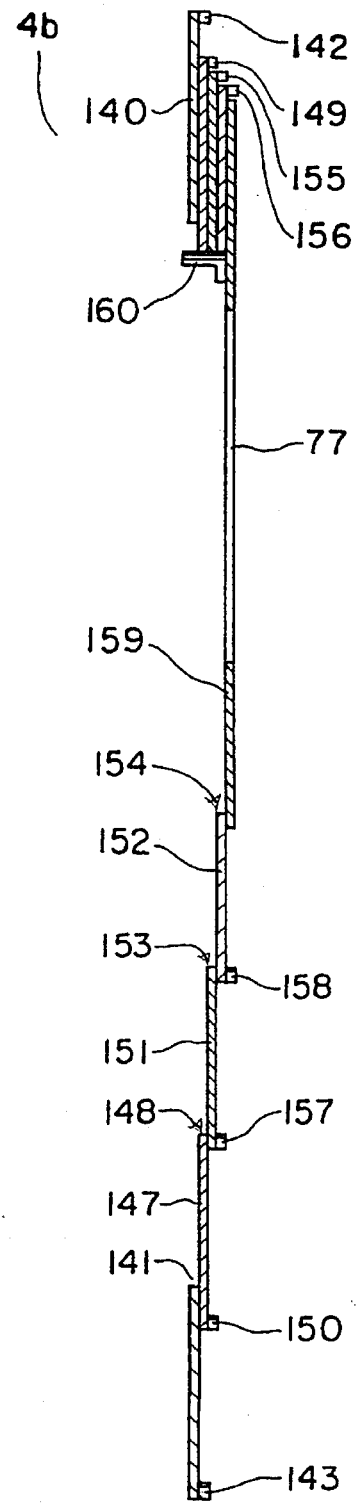

FIG. 41
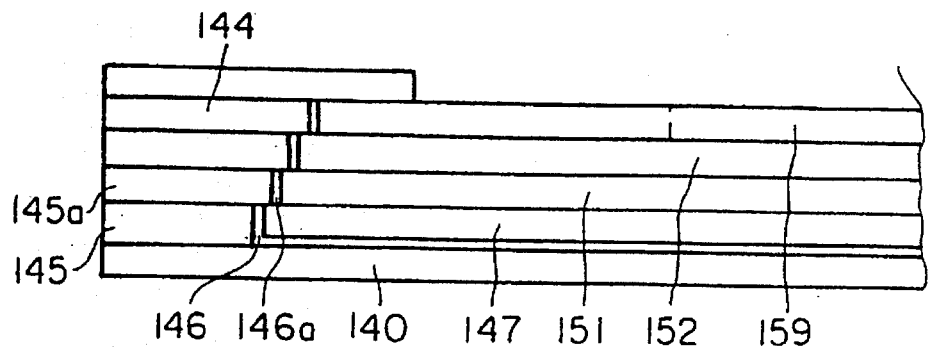
FIG. 44
FIG. 45
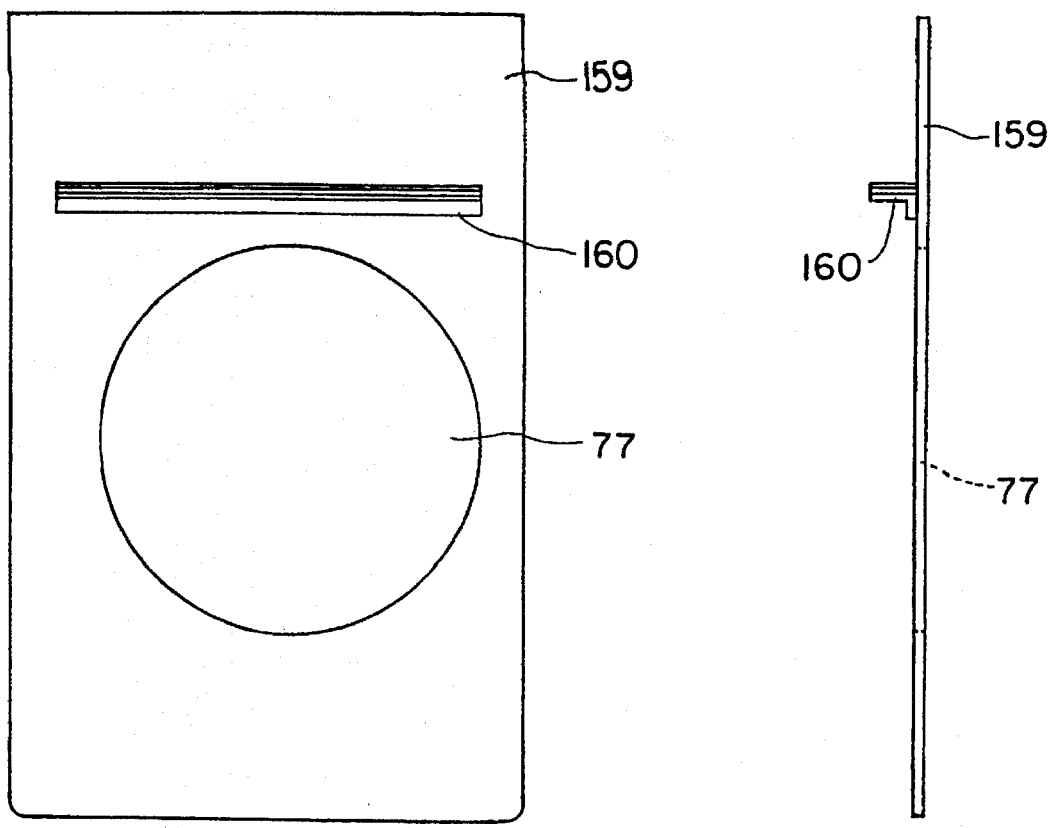

FIG. 42
FIG. 43
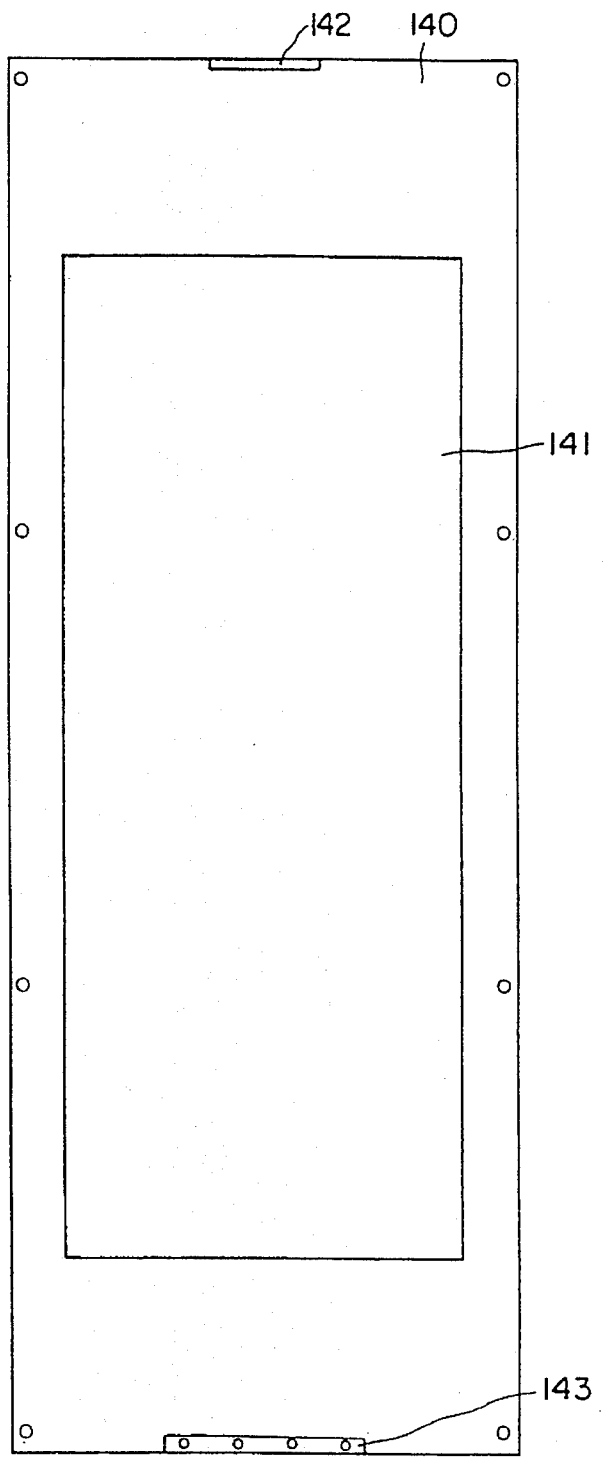
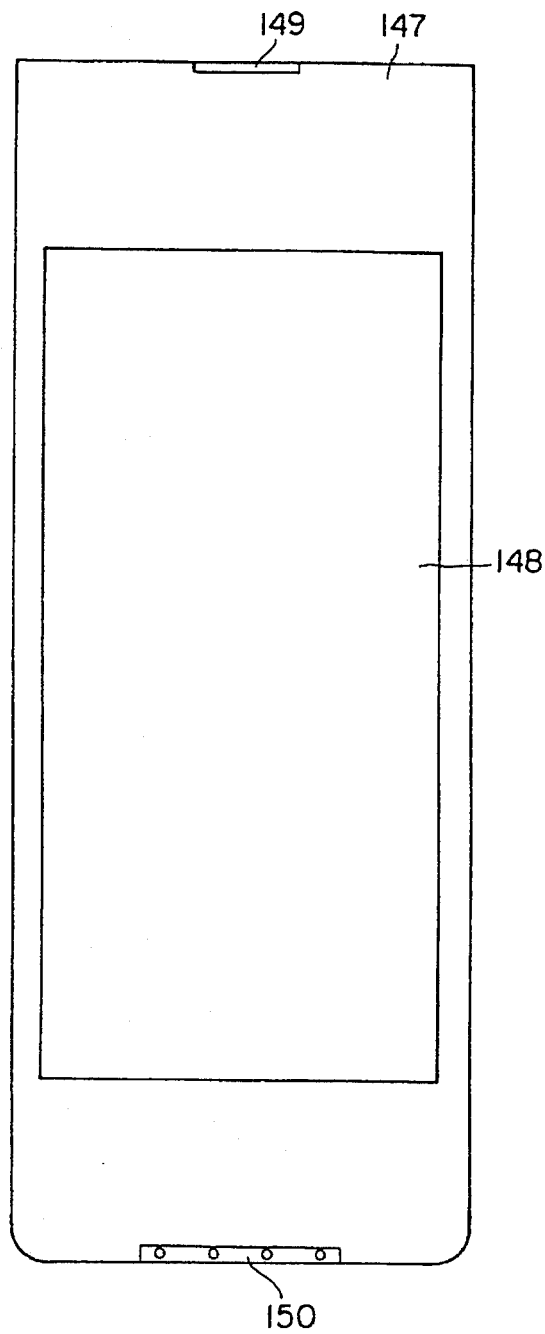

SLIDE COVER APPARATUS FOR MACHINE TOOL

BACKGROUND OF THE INVENTION

1. Field of the Invention

The present invention relates to a slide cover apparatus which is provided between a work station and a machining head unit with a tool spindle for preventing coolant, cutting chips or the like from invading into the zone for the machining head unit.

2. Discussion of the Related Art

In a known machining head unit of a machine tool or the like for effecting cutting operations on a workpiece, a spindle head with a tool spindle at its front end is provided to be movable toward and away from a work table. During machining operations, cutting chips, dust, coolant and so on scatter around the work table, which disadvantageously makes the working circumstance poor. Parts of the scattering cutting chips adhere to the spindle head, and this causes the machining unit to be liable to malfunction.

To overcome the aforementioned problems, an arrangement has been made wherein a partition wall or cover assembly having a tool-path hole through which the nose of a tool spindle of the head passes is provided between a work table and a machining head unit for preventing cutting chips from scattering thereby to adhere to the machining head unit. The partition wall assembly is practically used as of the type that a plurality of slide covers are telescopically extensible either in a vertical direction with the vertical movement of a tool spindle or in a horizontal direction with the horizontal movement of the tool spindle. However, the partition wall apparatus of the aforementioned type cannot be used for machine tools of the type wherein a tool spindle head is movable in three mutually perpendicular directions as is true with a machine tool such as, for example, machining center. Therefore, it is impossible to provide between the work table and the spindle head measures which can reliably prevent the scattering of cutting chips, coolant or the like.

Further, since the plural slide covers are moved with themselves being engaged with one another, there are required rails for supporting and guiding the slide covers and plural sub-covers engaged with a center cover for surrounding the same. All of these members have to be attached to a jig base. This not only makes the assembling work troublesome and time-consuming, but also makes the accessibility for machine inspection or repair difficult, because the members have to be removed and reassembled in a predetermined order.

Additionally, in the known cover apparatus, the slide covers are moved by the tool spindle which is inserted into the tool-path hole of the center cover, and nothing but the engagement of the tool spindle with the center cover is provided to synchronize movements of the spindle head and the slide covers. For this reason, once the tool spindle is taken out from the tool-path hole of the center cover for tool change purpose, the synchronization of the center cover and the tool spindle is lost, and difficulties would arise in subsequently inserting the tool spindle into the tool-path hole of the center cover. Furthermore, since the power to move the slide covers depends on the movement of the spindle head, excessive load acts upon the spindle head, thereby adversely affecting the machining accuracy of the workpiece.

SUMMARY OF THE INVENTION

Accordingly, it is a primary object of the present invention to provide an improved slide cover apparatus capable of reliably isolating a machining head unit from a workpiece support unit whereby the machining head unit can be free from contamination by coolant, cutting chips and dusts.

Another object of the present invention is to provide an improved slide cover apparatus which can partition a machining head unit from a workpiece support unit except for a tool-path hole enabling the tool spindle of the machining head unit to access to a workpiece on the support unit and which can move the tool-path hole in such a manner as to follow the movements of the tool spindle in a plane whereby the isolation of the machining head unit from a machining zone can be reliably attained.

Still another object of the present invention is to provide an improved slide cover apparatus which does not require any actuator for effecting telescopic movements of a plurality of partition cover boards.

A further object of the present invention is to provide an improved slide cover apparatus of the aforementioned character which is particularly designed for use in a machine tool of the type that a tool spindle is movable in three orthogonal directions.

A still further object of the present invention is to provide an improved slide cover apparatus capable of constituting a vertically movable cover assembly which requires fewer boards, whereby the cover apparatus is simplified in construction, reduced in cost and reliable in operation.

A yet further object of the present invention is to provide an improved slide cover apparatus capable of effectively utilizing its cover frame as a conduit for coolant.

It is an additional object of the present invention to provide an improved slide cover apparatus in which a motion link mechanism for telescopically linking plural partition boards is capable of performing a dumper function and a sealing function whereby not only the isolation of a machining head unit from a machining zone can be ensured, but the telescopic motions of the partition boards can also be done smoothly and noiselessly.

Briefly, according to the present invention, there is provided an improved slide cover apparatus which is provided between a machining head unit and a workpiece support unit for partitioning the former from the latter. The apparatus comprises first and second cover assemblies. A main board and plural sub-boards of the first cover assembly are telescopically movable in a first direction, while a center board and plural sub-boards of the second cover assembly which cover a rectangular window formed on the main board are telescopically movable in a second direction perpendicular to the first direction, the first and second directions being encompassed within a plane perpendicular to the rotational axis of a tool spindle of the machining head unit. The center board is formed with a tool-path hole for enabling the tool spindle to access to a workpiece on the support unit. First and second motion link means are further provided, the first one of which transmits the movement in the first direction of the tool spindle to the main board and the second one of which transmits the movement in the second direction of the tool spindle to the center board.

With this configuration, the machining head unit is reliably partitioned from a machining zone around the workpiece support unit except for the tool-path hole which enables the tool spindle to pass therethrough for access to the machining zone. This advantageously prevents the machining head unit from being contaminated by coolant, cutting chips and dusts, so that the accuracy in motion of the machining head unit can be highly maintained for a long run of use. Moreover, no actuator is required for moving the first and second cover assemblies in connection with the movement of the tool spindle, so that the cover apparatus is simplified in construction and reliable in operation.

In another aspect of the present invention, the second cover assembly movable vertically is constructed by a center board and a fewer number of sub-boards, each of which is particularly arranged to cover both of upper and lower sides of the center board. This makes it possible to construct the second cover assembly as of light weight.

In still another aspect of the present invention, a frame guiding the first cover assembly is made of a pipe member, so that coolant can be led from an inlet port formed at, preferably, a lower portion of the frame to an outlet port formed at, preferably, an upper portion of the frame. This advantageously results in the improved appearance of a machine tool incorporating the slide cover apparatus.

BRIEF DESCRIPTION OF THE ACCOMPANYING DRAWINGS

The foregoing and other objects, features and many of the attendant advantages of the present invention may readily be appreciated as the same becomes better understood from the following description of the embodiments when considered by reference to the accompanying drawings, wherein like reference numerals designate same or corresponding parts throughout the several views, and in which:

FIGS. 6 and 7 are respectively front and side views of an upper rail member of the apparatus;

FIGS. 8 and 9 are respectively front and side views of a lower rail member of the apparatus;

Figure 34A:
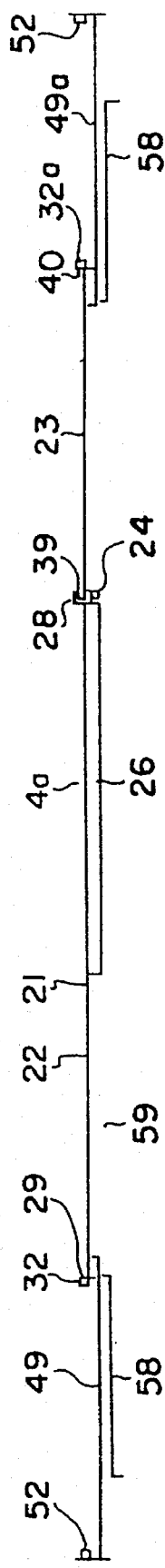
Figure 34B:
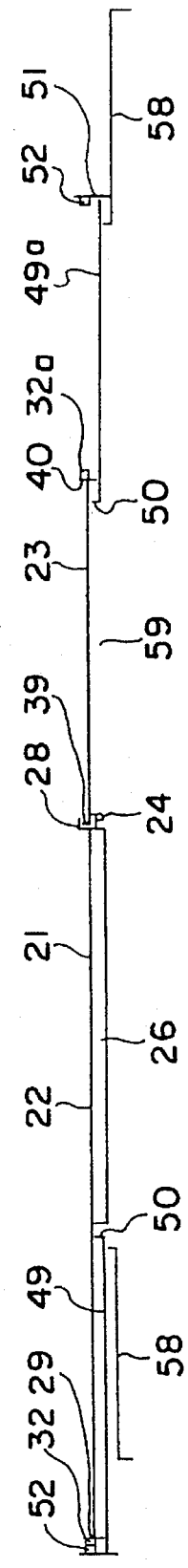
Figure 34C:
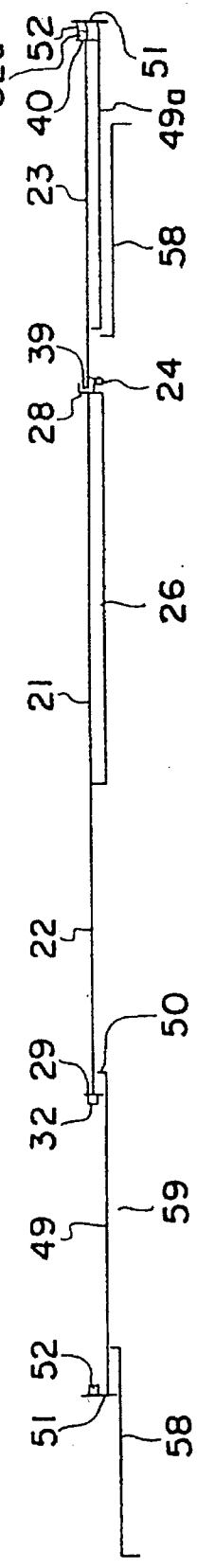
Figure 36:
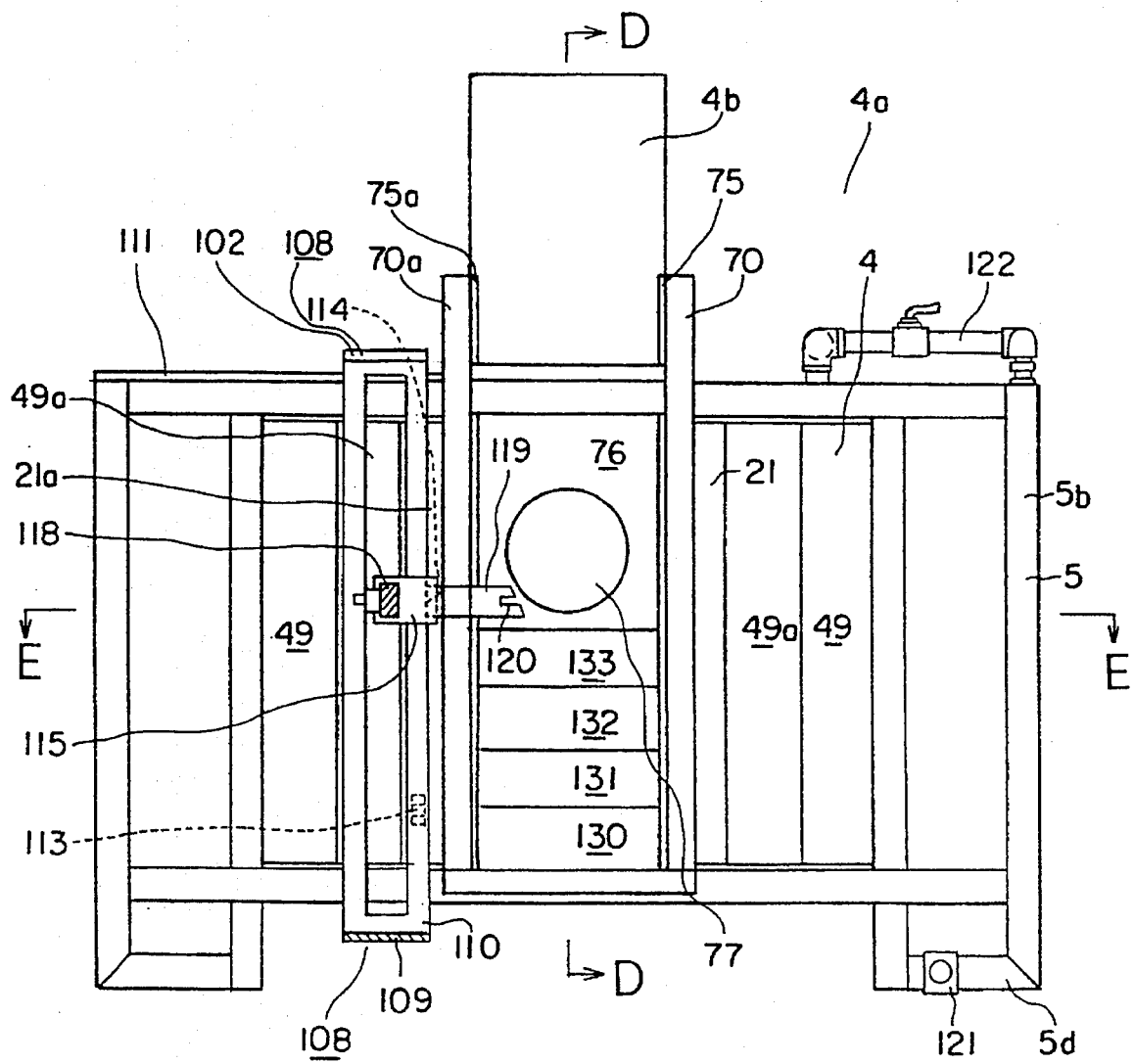
Figure 37:
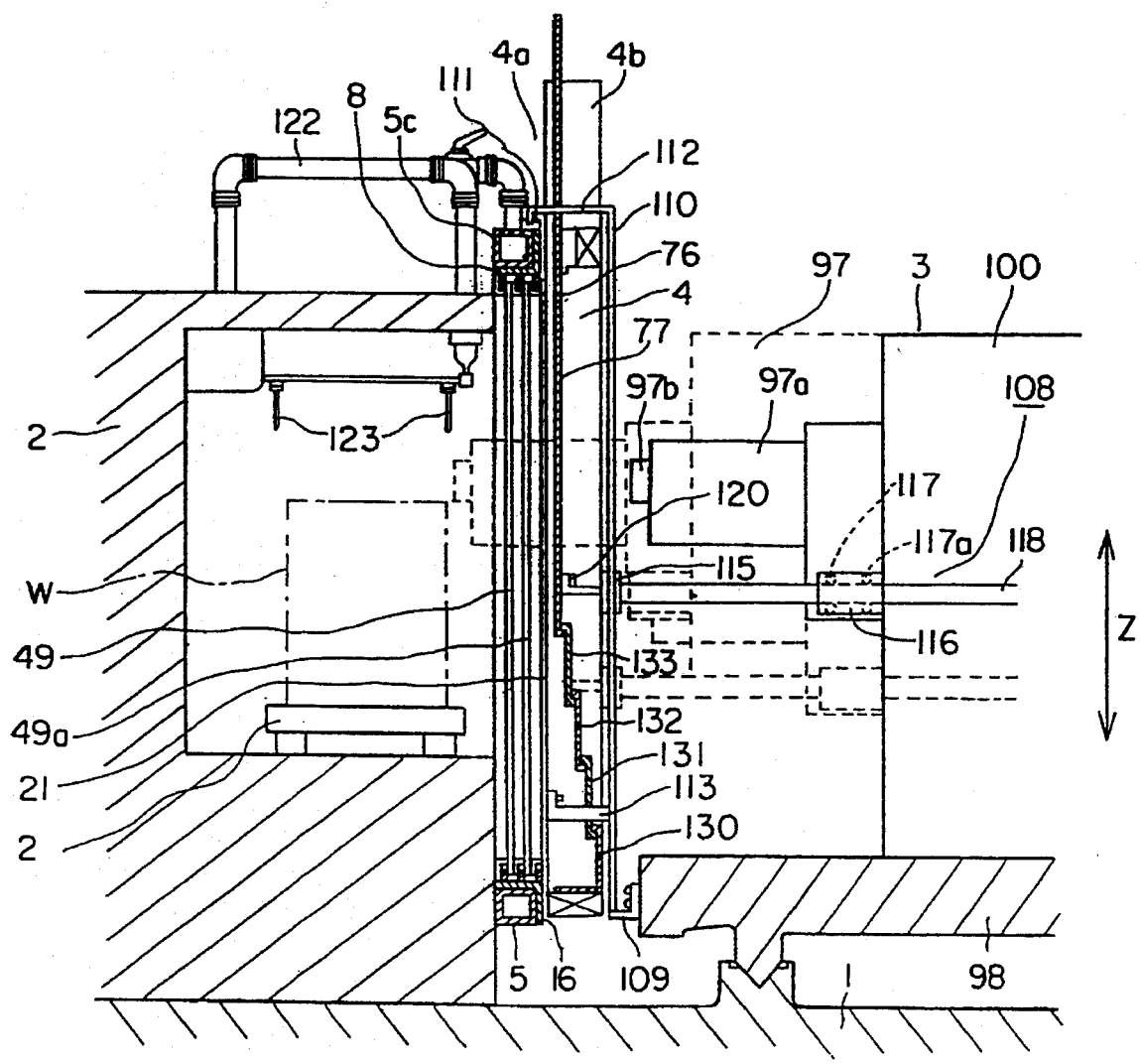
Figure 38:
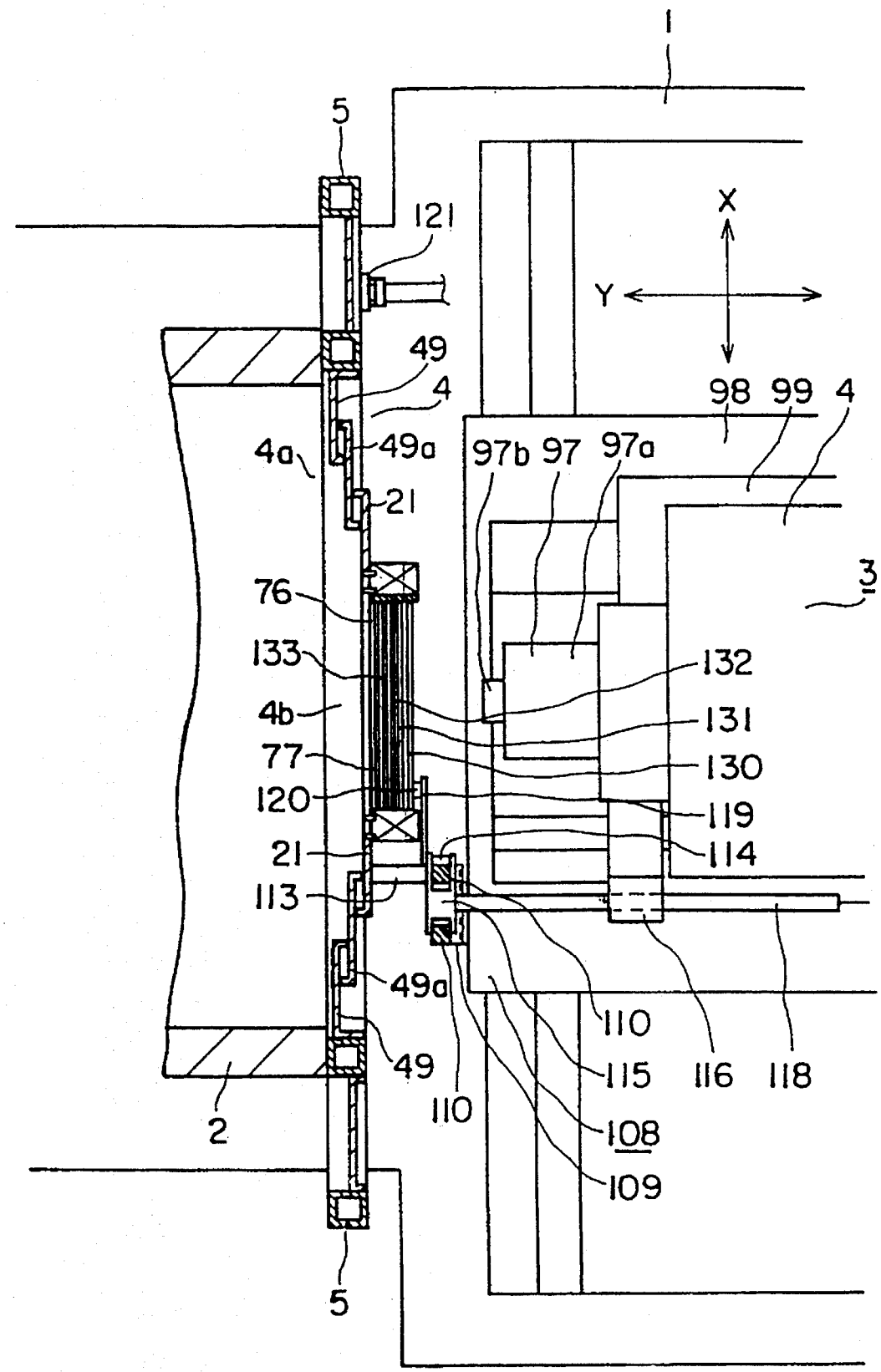

FIGS. 34(a) to 34(c) are schematic illustrations for showing the operation of a horizontal slide cover assembly of the apparatus in different states respectively;

FIGS. 35(a) to 35(d) are schematic illustrations for showing the operation of a vertical slide cover assembly of the apparatus in different states respectively;

FIG. 36 is a rear view of a slide cover apparatus according to the second embodiment of the present invention;

FIG. 37 is a sectional view of the second embodiment taken along the line D—D in FIG. 36, also showing a machining head unit and a workpiece support unit;

FIG. 38 is a partly sectional view taken along the line E—E in FIG. 36;

FIG. 39 is a front view of a vertical cover assembly of the apparatus according to the third embodiment of the present invention;

FIG. 40 is a sectional view of the vertical cover assembly taken along the line F—F in FIG. 39;

FIG. 41 is a fragmentary, top plan view of the vertical cover assembly;

FIG. 42 is a rear view of a main slide board used in the third embodiment;

FIG. 43 is a rear view of a vertical slide sub-board of the assembly shown in FIG. 39; and FIGS. 44 and 45 are respectively front and side views of a center slide board used in the assembly shown in FIG. 39.

DETAILED DESCRIPTION OF THE PREFERRED EMBODIMENTS

Figure 33:
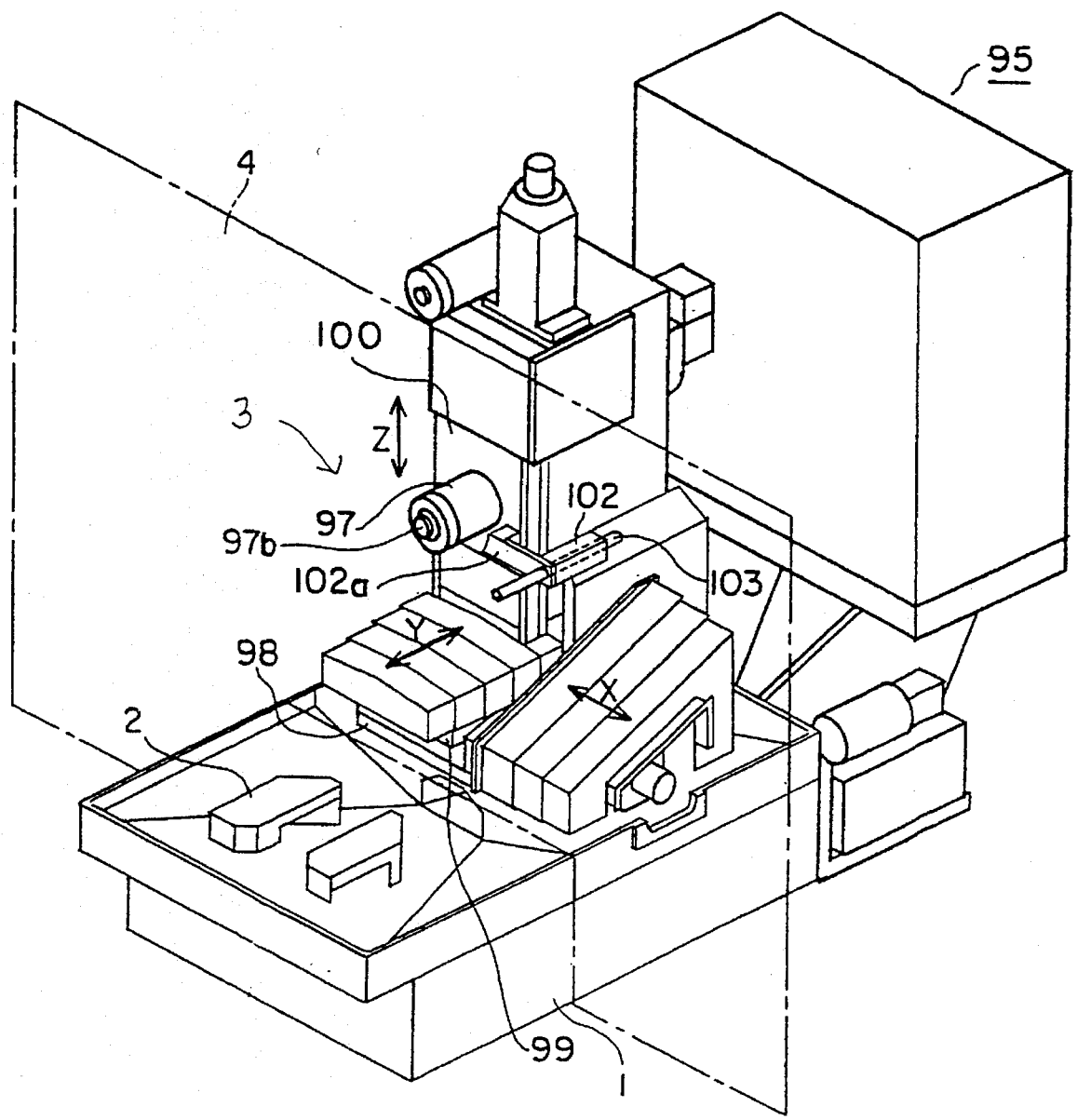
FIG. 33 is a perspective view of a machine tool into which the slide cover apparatus according to the present invention is incorporated.

Referring now to the drawings and, particularly, to FIG. 33 thereof showing the perspective view of a machining center which incorporates a slide cover apparatus 4 according to the present invention, numeral 1 denotes a bed of the machining center which bed also works for supporting the slide cover apparatus 4. The bed 1 provides thereon a jig base 2, on which a work table (not shown) of, preferably, a well-known rotary type is mounted, as described later in more detail. Between the jig base 2 and the spindle head unit 3, the slide cover apparatus 4 is arranged, whose cover frame 5 takes the form of a gantry.

(i. Cover Frame)

More specifically, as shown in FIGS. 1, 2, 4 and 5, a pair of upright beams 5a, 5b are provided connected by a cross beam 5c at its upper ends. Support foot beams 5d, 5e extending horizontally are further provided, which are connected with the lower ends of the upright beams 5a, 5b at outer ends thereof and at their inner ends with the lower ends of a gantry-shape lower cross beam 5f. That is, the cover frame 5 is fabricated by welding these beams 5a–5f, which are made of steel pipes each having a square hole for fluid flow, as described later in more detail. Numeral 6 denotes an elongate hollow beam, which is held at its opposite ends by a pair of L-letter hook members 7, 7a respectively secured to upper end portions of the upright beams 5a, 5b.

Figure 3:
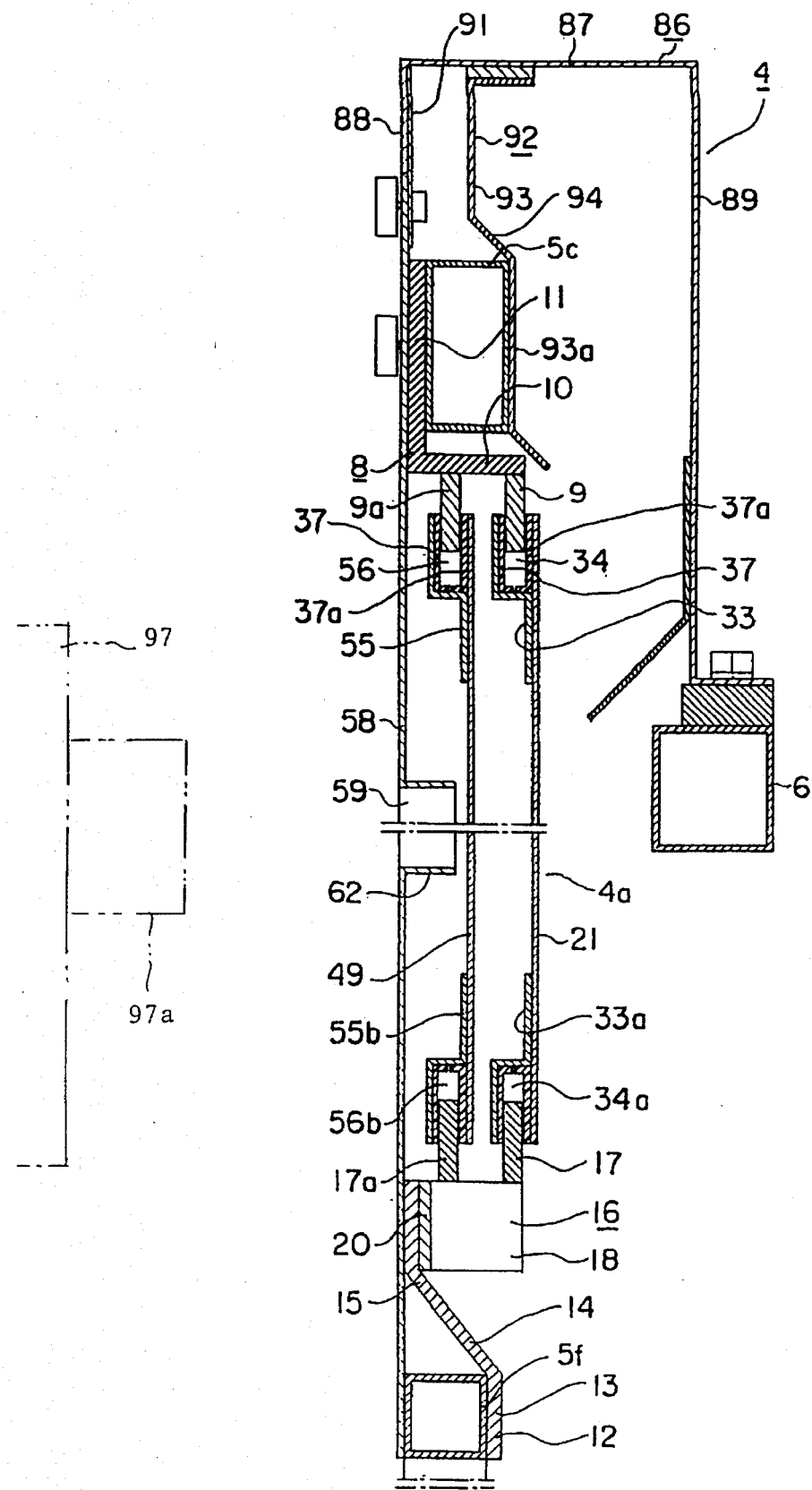
FIG. 3 is a cross-sectional view of the apparatus.
Figure 4:
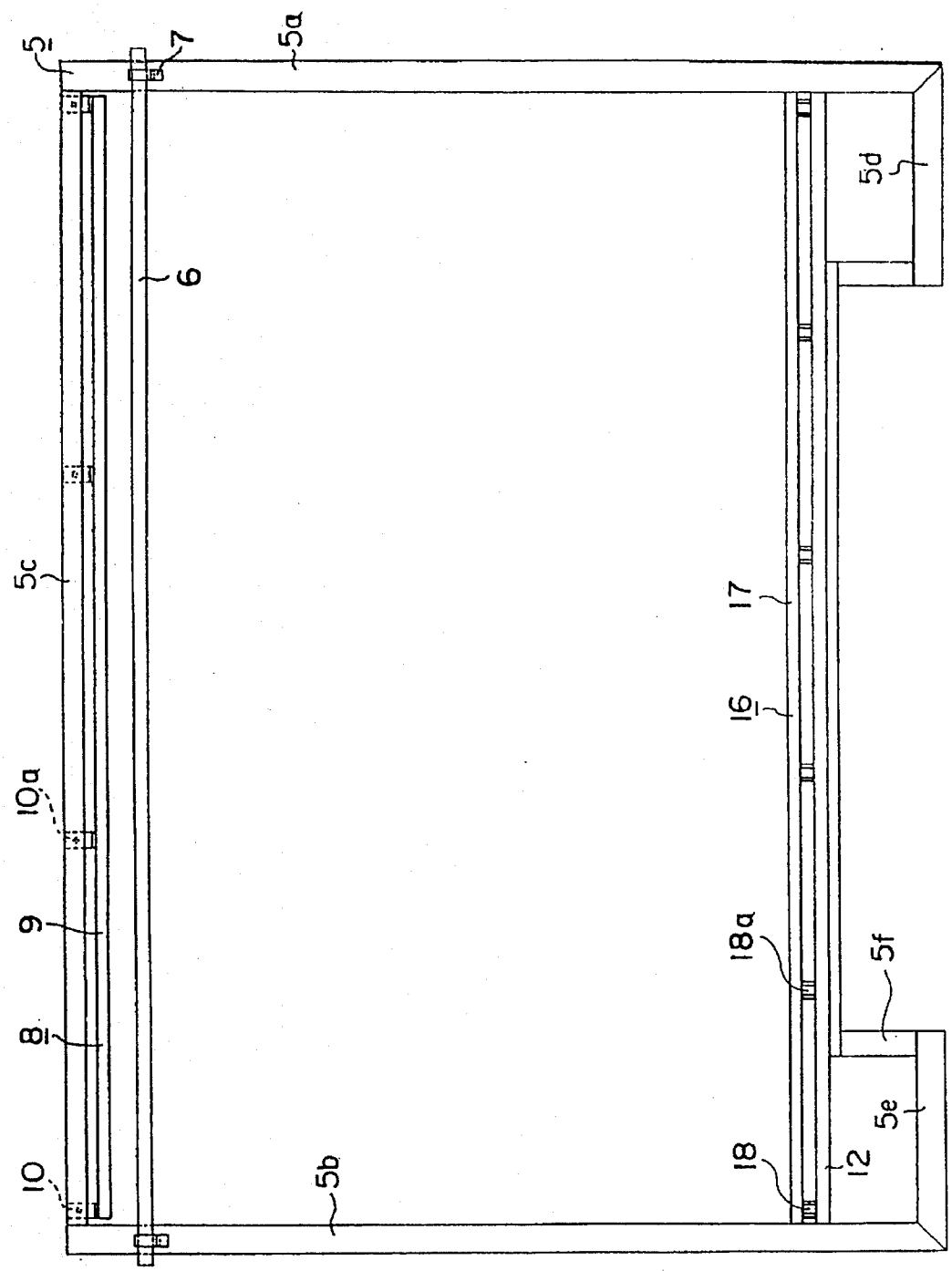
FIGS. 4 and 5 are respectively front and side views of a cover frame of the apparatus.
Figure 5:
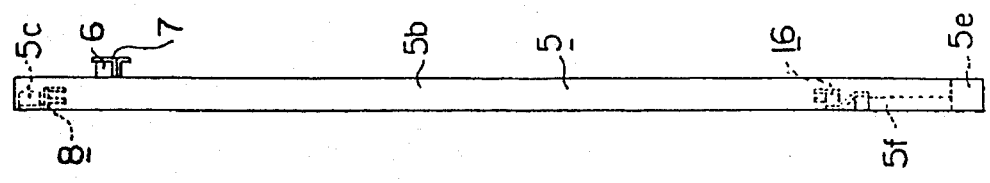

Referring now to FIG. 3, an upper rail member 8 horizontally provided within the frame 5 is composed two guide rails 9, 9a which are spaced in a front-rear direction and which are extended over the entire length of the upper cross beam 5c in parallel therewith, and a number of attaching members 10, 10a, ... of L-letter shape shown in FIGS. 6 and 7, which are arranged at suitable intervals along the upper cross beam 5c for hanging the two rails 9, 9a from the upper cross beam 5c in such a manner as to secure upright portions 11, 11a, ... of the members 10, 10a, ... to the rear surface of the cross beam 5c by means of bolts. A chip deflector plate 12 having the same length as the cross beam 5c includes a fixed portion 13 secured to the front surface of the lower beam 5f, a slanted portion 14 extending from the fixed portion in an upper-rear direction, and an upright portion 15 extending from the slanted portion 14. A lower rail member 16 is horizontally arranged within the frame 5. The member 16 includes two guide rails 17, 17a in correspondence respectively to the upper rails 9, 9a and in parallel thereto. Attaching members 18, 18a, ... are arranged at suitable intervals in the longitudinal direction of the rails 17, 17a, as shown in FIG. 8. Each of the attaching members 18, 18a, ... is a plate member of U-shape in horizontal section which is composed of two plate-like facing portions 19, 19a and a fixing portion 20, as is best understood from FIGS. 8 and 9. The lower rails 17, 17a are secured by, e.g., welding at lower surfaces thereof onto the fixing members 18, 18a, ..., with themselves crossing the facing portions 19, 19a of each attaching member, and the fixing portions 20 of the members 18, 18a, ... are fixed to the front face of the upright portion 15 of the chip deflector plate 12, whereby the lower rail member 16 is secured to the chip deflector plate 12, with the slanted portion 14 of the chip deflector plate 12 being right under the the lower rail member 16, as shown in FIG. 3.

(ii. Horizontal Cover Assembly)

Figure 1:
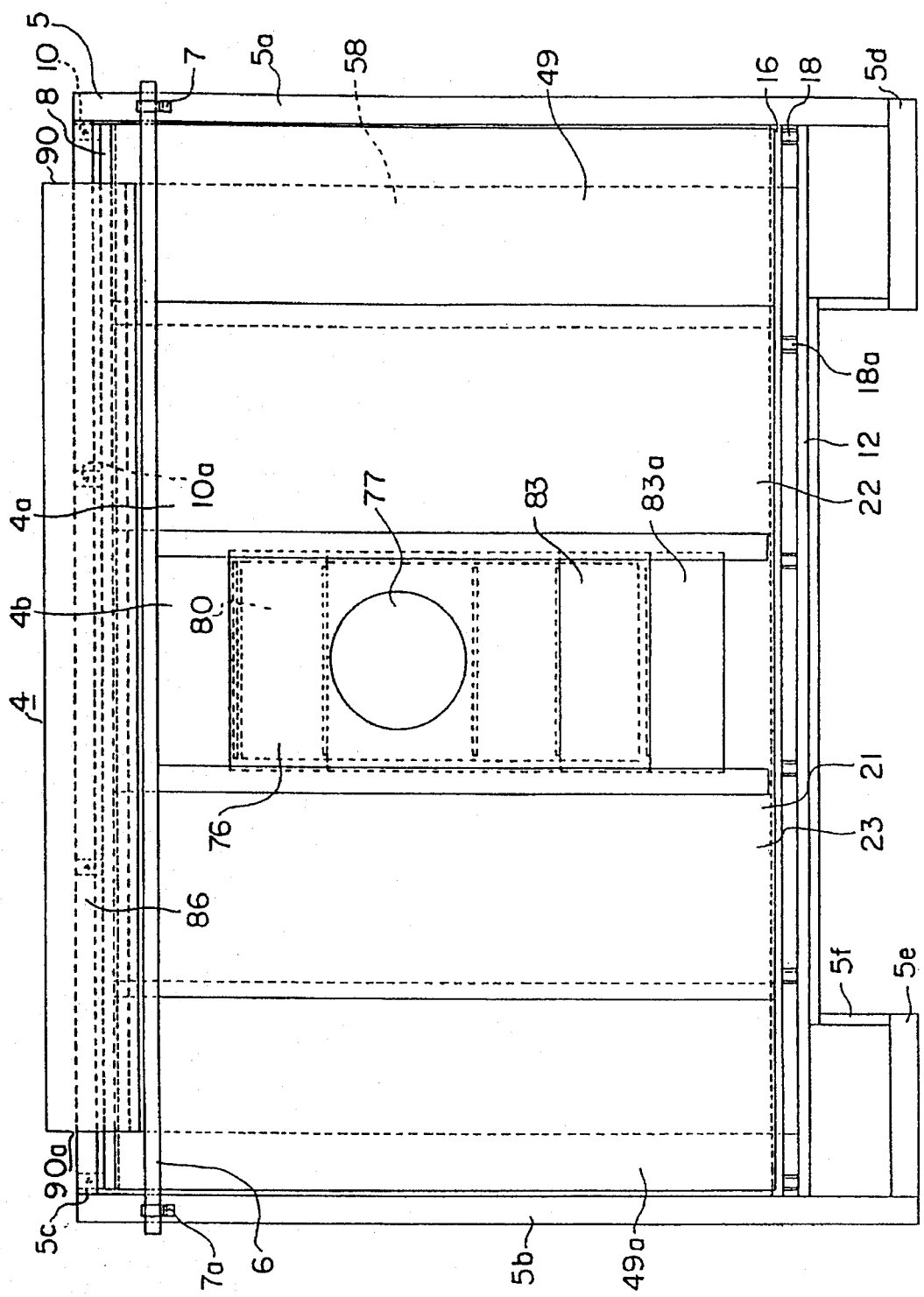
FIG. 1 is a front view of a slide cover apparatus according to the first embodiment of the present invention.

Referring to FIGS. 1 and 3, there is shown a main slide board 21, which is guided by the upper and lower rails 9, 17 for horizontal movement. The main slide board 21 constitutes a part of a horizontal cover assembly 4a and is composed of a large-size board 22 and a small-size board 23 which are bodily connected at fastening portions 24, 24a, shown in FIG. 2. Description will now be made with the large size board 22 which is a prime component of the main slide board 21.

Figure 10:
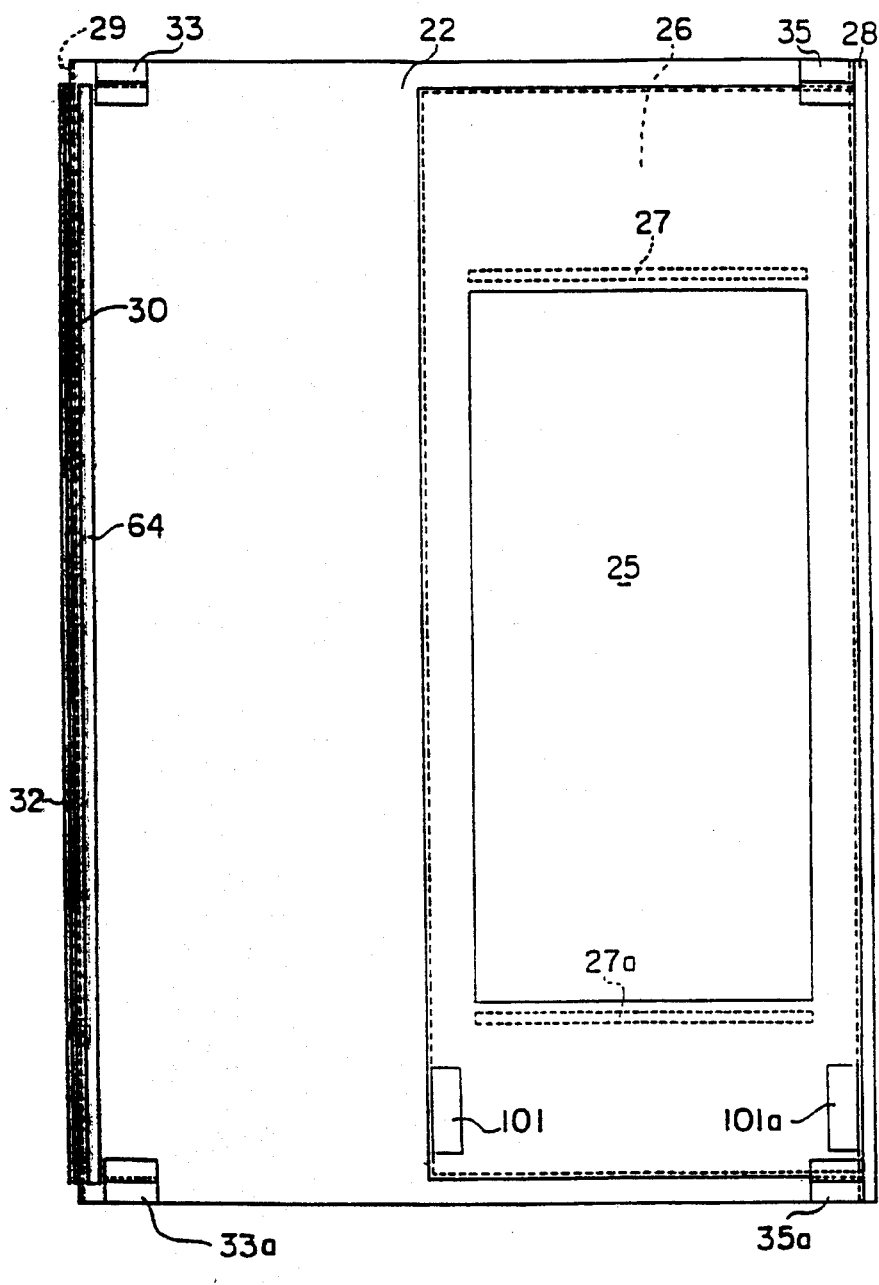
FIGS. 10 to 12 are respectively rear, plan and side views of a large-size board constituting a main slide board of the apparatus.
Figure 12:
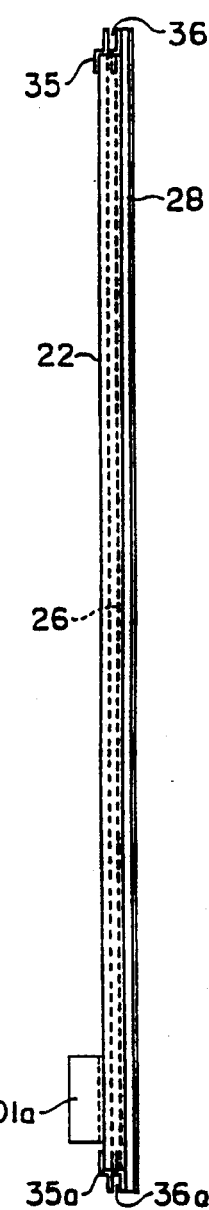
Figure 11:
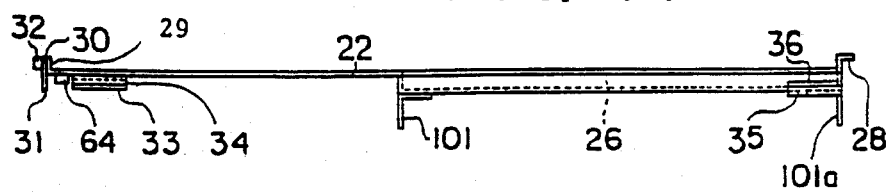

Referring to FIGS. 10 to 12, at the central portion of the main slide board 21, in other words, at one side of the large size-board 22 close to the small-size board 23, there is formed a vertically extending rectangular window 25, which is formed at a central area of a vertically extending rectangular depressed portion 26.

Stoppers 27, 27a like square section bars for vertical slide boards referred to later are horizontally secured to the front surface of the depressed portion 26 respectively at the upper and lower ends of the window 25.

As understood from FIGS. 10 through 12, a connection plate portion 28 of the large-size board 22 which portion 28 works for connection with the small-size board 23 is formed in such a way that one lateral end of the large-size board 22 is first bent toward the front side and that the extreme end of one lateral end so bent is further bent toward the small-size board 23. An abutment portion 29 is protruded from the other lateral end of the large-size board toward the front side, as best shown in FIG. 11. The upper end of the abutment portion 29 is defined below the upper rail 9, while the lower end thereof is defined above the lower rail 17. An end seal plate 30 which is secured to the abutment portion 29 therealong, is in alignment with the abutment portion 29 at the front side of the large-size board 22 and extends its rear side edge from the rear surface of the large-size board 22 thereby to form a portion which prevents chips from entering inbetween the main board 21 and a sub-board referred to later. Further, a cushion 32 made of synthetic resin is affixed to the end seal plate 30 along the front side edge thereof, as shown in FIGS. 10 and 11.

A pair of rail embracing members 33, 33a are secured by, e.g., welding to the rear surface of the large-side board 22 respectively at upper and lower conners of the other lateral side thereof. Similarly, another pair of rail embracing members 35, 35a are secured to the rear surface of the large side board 22 respectively at upper and lower conners of one lateral side thereof. These embracing members 33, 33a, 35, 35a enable the large-size board 22 to be guided by the rails 9 and 17 as a result of embracing the rails 9 and 17 in cooperation with the large-size board 22 in the manner as shown in FIG. 3. For anti-friction purpose, a pair of L-shape liners 37, 37a made of synthetic resin are fit in each of four rail slots 34, 34a, 36, 36a which the embracing members 33, 33a, 35, 35a define together with the large-side board 22.

Figure 15:
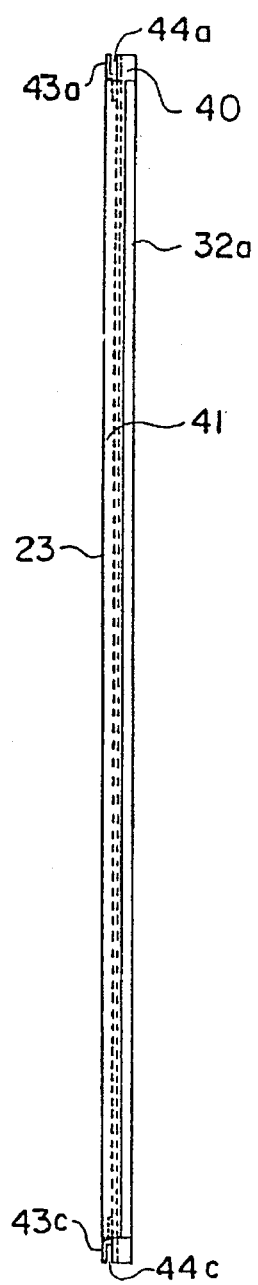

The small-size board 23 which is another prime component of the main slide board 21 will then be described in detail with reference to FIGS. 13 to 15.

The board 23 is formed with a connection portion 39, which is bent toward the front side at the other lateral side portion for connection with the connection plate portion 28 of the large-size board 22. The board 23 is further formed at one lateral side thereof with an abutment portion 40, which is bent to protrude toward the front side of the board 23. The abutment portion 40 defines its upper end below the upper rail 9 and its lower end above the lower rail 17. An end seal plate 41 is secured to the abutment portion 40 along the same. The plate 41 is in alignment at its front side edge with the abutment portion 40 and protrudes its rear side edge rearwards from the rear surface of the small-size board 23 thereby to provide a portion which prevents chips from entering inbetween the main board 21 and a sub-slide board referred to later. A cushion 32a made of synthetic resin is affixed to the end seal plate 41 along the same.

Like the large-size board 22, the small-size board 23 has rail embracing members 43, 43a, 43b, 43c, which are secured to the rear surface of the small-size board 23 at the four conners thereof. The embracing members 43, 43a, 43b 43c enable the small-size board 23 to be guided by the rails 9 and 17 in the same manner as the large-size board 21 is guided as shown in FIG. 3.

Figure 2:
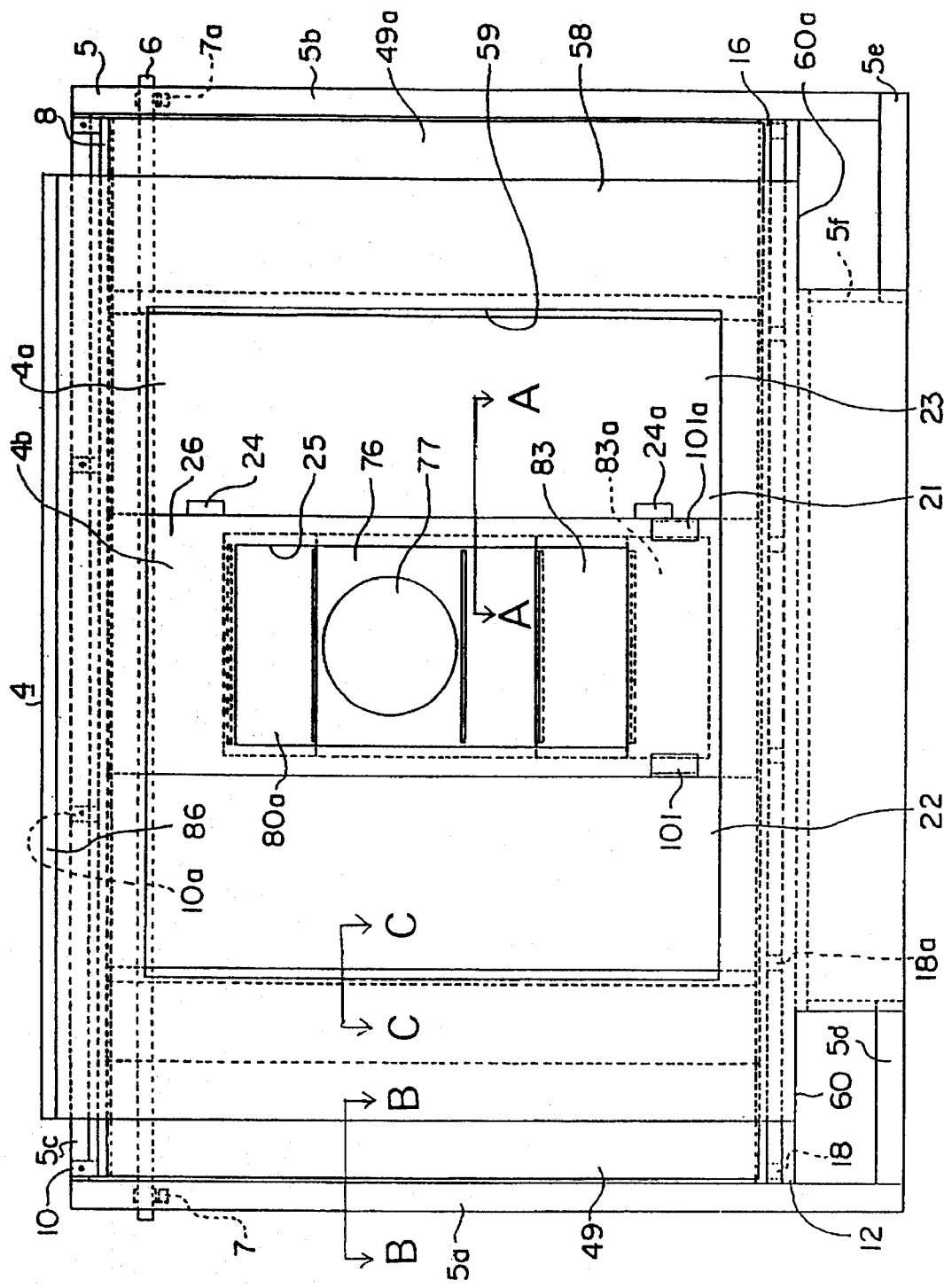
FIG. 2 is a rear view of the apparatus shown in FIG. 1.
Figure 16:
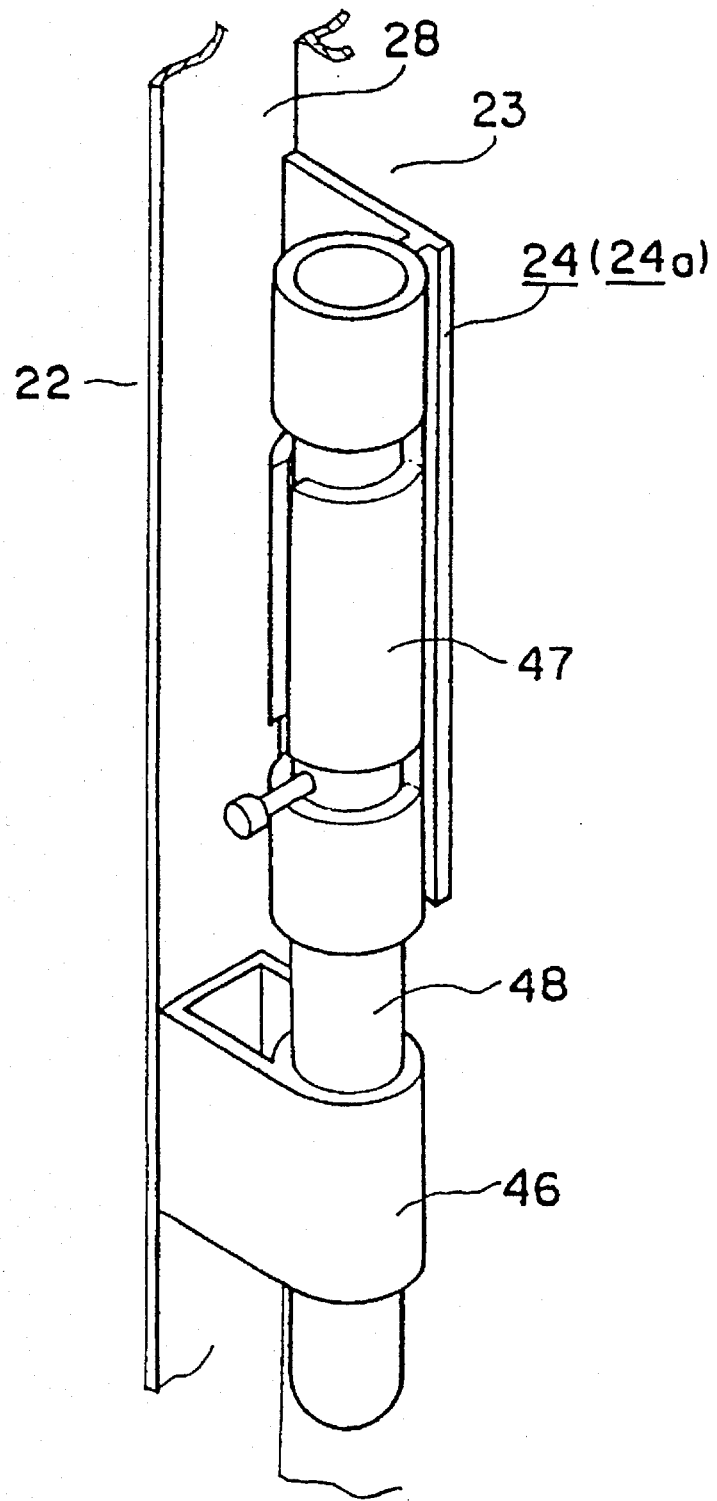
FIG. 16 is a perspective view of a mechanism detachably connecting the large-size board with the small-size board.

FIG. 16 illustrates the manner in which the large-size board 22 is connected with the small-size board 23 at each of the connection portions 24, 24a shown in FIG. 2. As illustrated therein, the large-size board 22 has secured a sleeve 46 at its lateral end close to the small-size board 23, while the small-size board 23 has secured a rod holder 47 at its lateral end close to the large-size board 22. A drop rod 48 is held in the rod holder 47. By inserting the lower end of the drop rod 48 into the sleeve 46, the large and small size boards 22, 23 are connected thereby to constitute the main slide board 21. This makes it easy to separate these boards 22, 23 from each other for access to the front portion of the machining head unit 3 in repair or maintenance work.

Figure 17:
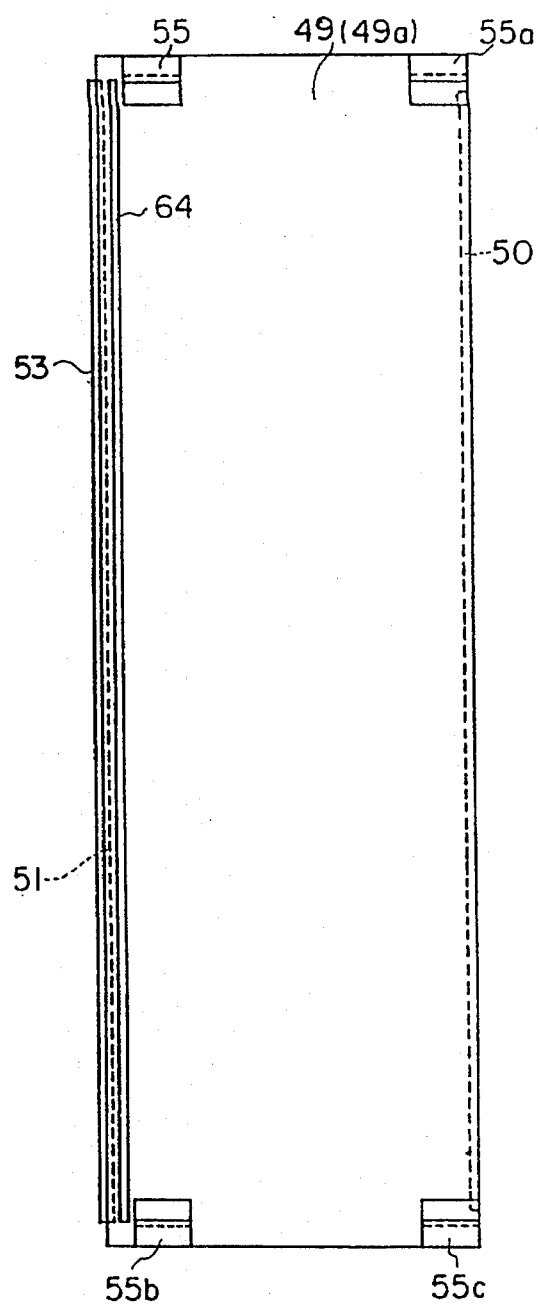
FIGS. 17 to 19 are respectively rear, plan and side views of a sub-slide board of the apparatus.
Figure 19:
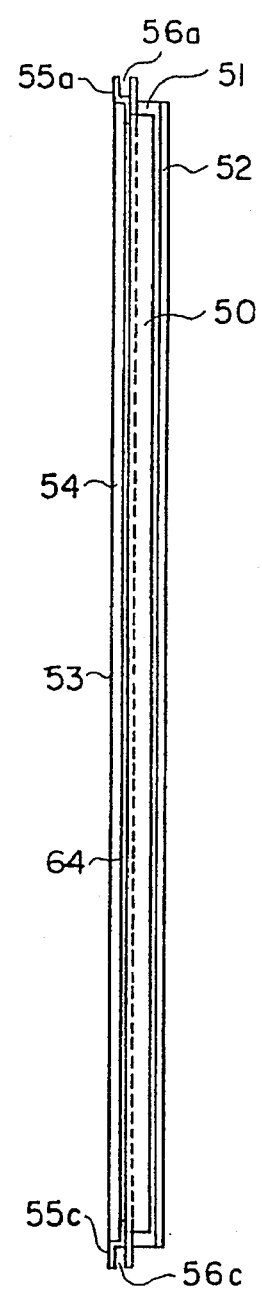
Figure 18:
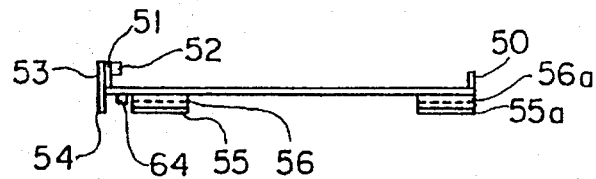

Referring back to FIGS. 1 through 3, sub-slide boards 49, 49a constituting other components of the horizontal cover assembly 4a are arranged at the rear side of the main slide board 21 and respectively at opposite ends of the same. In configuration, each of the sub-slide boards 49, 49a is substantially the same as the aforementioned small-size board 23 of the main slide board 21, and one of the sub-slide boards 49 is symmetrical to the other 49a with respect to the main slide board 21. As the board 49 is typically shown in FIGS. 17 through 19, each of the sub-slide boards 49, 49a is provided with a hook portion 50 at its laterally inner end and with another hook portion 51 at its laterally outer end. The hook portions 50, 51 define their upper ends below the upper rail 9a and their lower ends above the lower rail 17a.

Figure 29:
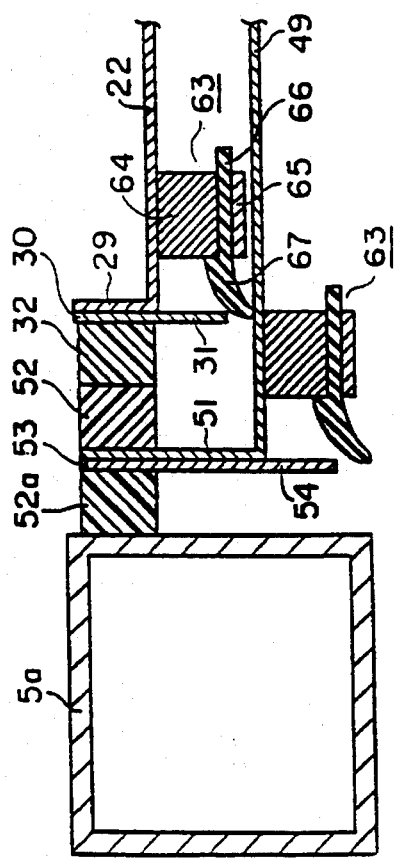
FIG. 29 is a fragmentary sectional view taken along the line B—B in FIG. 2 in the state that the large-size board 22 is at its left slide end as viewed from the rear side.

As shown in FIG. 29, a cushion 52 made of synthetic resin which corresponds to the cushion 32 of the main slide board 21 is secured to an inner side face of the hook portion 51. A cushion 52a vertically extending is secured to the upright frame 5a. A hook plate 53 secured to an outer side face of the hook portion 51 is in alignment at its front edge with the hook portion 51 and extends its rear edge over the rear surface of the sub-slide board 49. Although not shown, the laterally outer end of the sub-slide board 49a takes the same configuration as that shown in FIG. 29.

Referring back to FIG. 17, rail embracing members 55, 55a, 55b, 55c are secured to four corners on the rear surface of each of the sub-slide boards 49, 49a. As shown in FIG. 3, these rail embracing members 55, 55a, 55b, 55c enable the sub-slide boards 49, 49a to be guided by the upper and lower rails 9a, 17a. For anti-friction purpose, a pair of liners of L-shape are fit in each of rail slots 56a, 56c which the embracing members 55, 55a, 55b, 55c make together with the associated sub-slide board 49 (or 49a).

Figure 20:
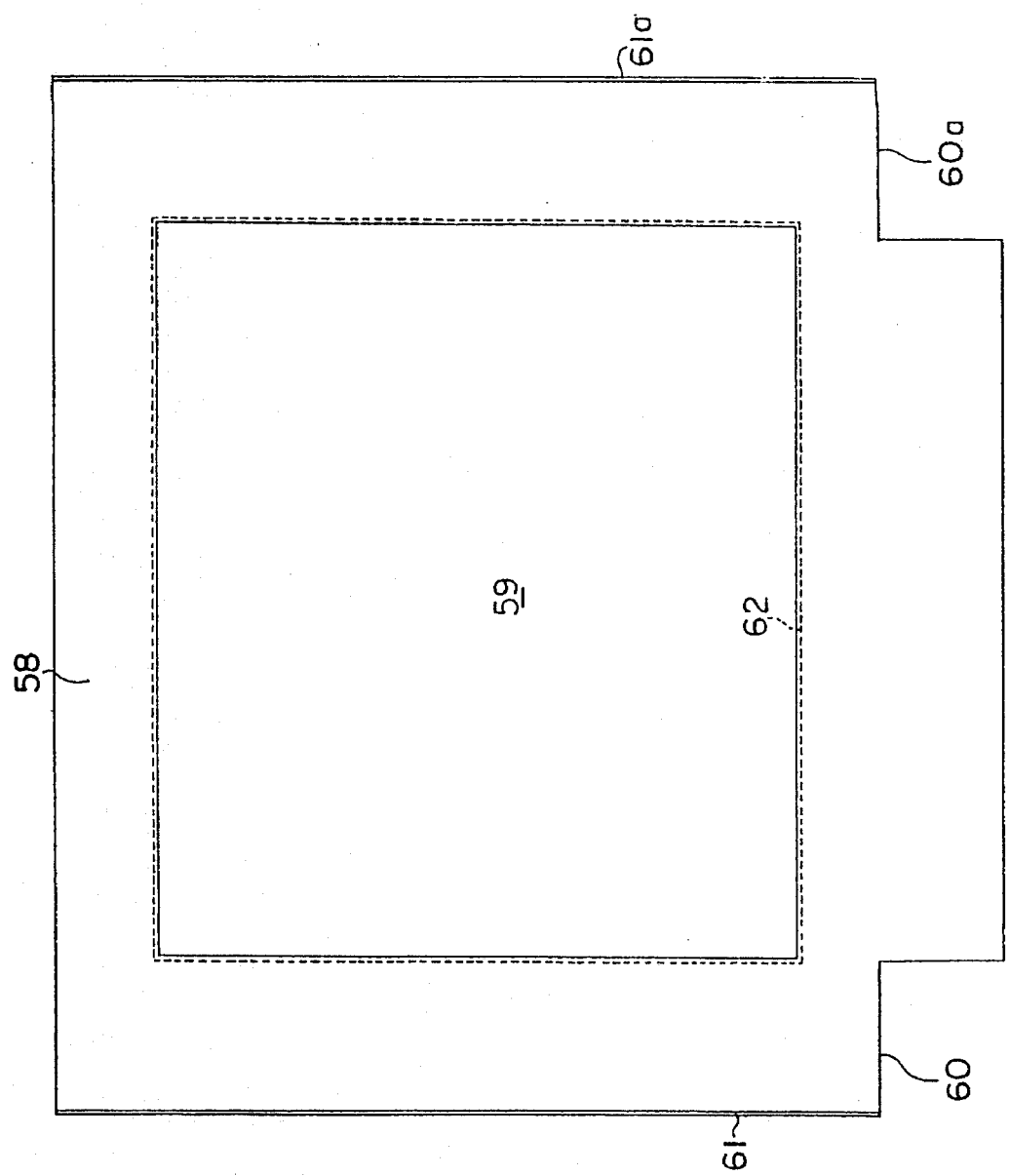
FIGS. 20 and 21 are respectively front and side views of a rear panel of the apparatus.
Figure 21:
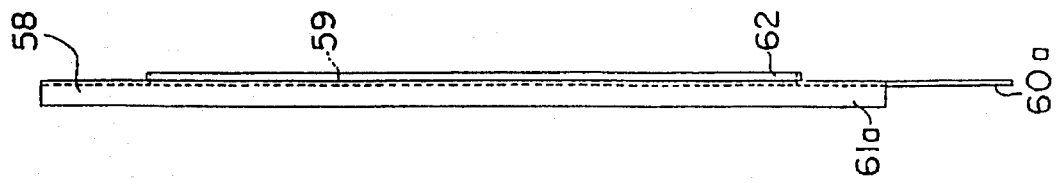

Referring again in FIGS. 2 and 3, there is provided secured to the frame 5 a rear cover 58, whose lateral length is shorter than the cross beam 5c. As shown in FIGS. 20 and 21, the rear cover 58 is formed with a window 59 at its central portion and cutouts 60, 60a of a rectangular shape respectively at two lower conners thereof. Margins 61, 61a at the laterally opposite ends of the rear cover 58 protrude rearwards, and four margins 62 of the rectangular window 59 protrude forwardly. Horizontal margins defining the cutouts 60, 60a are along the lower margin of the slanted portion 14 of the chip deflector 12, while vertical margins defining the cutouts 60, 60a are along the outer margins of the gantry beam 5f. The upper margin of the rear cover 58 is defined above the cross beam 5c. Further, compared to the main slide board 21, the window 59 is defined to be shorter in its vertical length and to be slightly longer in the lateral or horizontal length.

Figure 30:
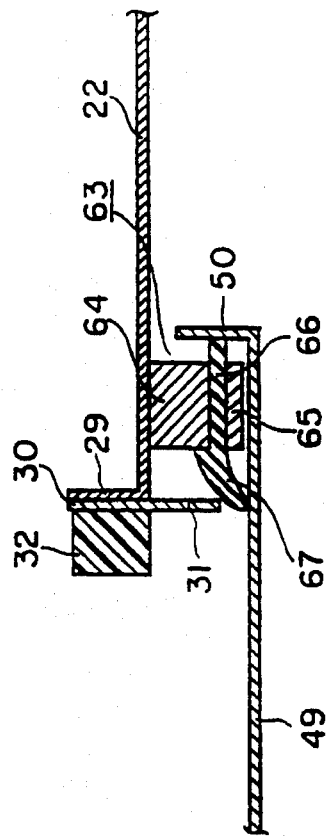
FIG. 30 is a fragmentary sectional view taken along the line C—C in FIG. 2.

Referring then to FIGS. 29 and 30, two towing bars 63, 63 are respectively secured to the rear surfaces of the main slide board 21 (the large-size board 22) and the sub-slide board 49. As understood from FIGS. 10 and 17, the towing bars 63, 63 extend vertically along the laterally outer ends of the large-size board 22 of the main slide board 21 and the sub-slide board 49. Each of the towing bars 63 comprises a mounting bar 64, a rubber wiper 66 of the same vertical length as the mounting bar 64 and a securing plate 65. Lip portions 67 at one side of the wipers 66 are elastically urged on the front surfaces of the sub-slide board 49 and the rear cover 58, respectively, to work as wipers, while other side ends of the wipers 66 protrude towards the laterally inner side. When the overlapping between the main slide board 21 and the sub-slide board 49 is minimum, the hook portion 50 of the sub-slide board 49 is brought into engagement with the laterally inner side of the wiper 66, as shown in FIG. 30. This engagement enables the main slide board 21 to tow the sub-slide board 49.

Figure 13:
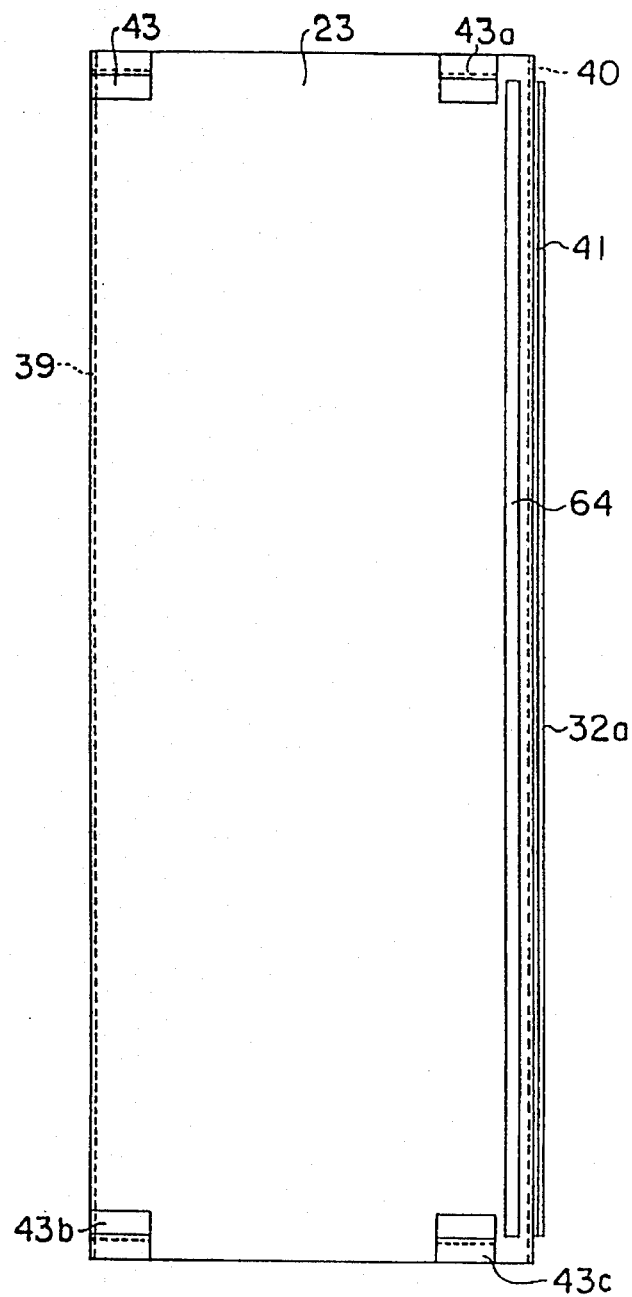
FIGS. 13 to 15 are respectively rear, plan and side views of a small-size board constituting the main slide board.
Figure 14:
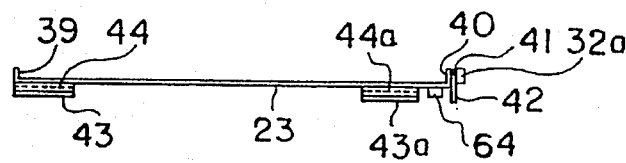

It is to be noted that two other towing bars of the same configuration as those shown in FIG. 29 are also secured to the rear surfaces of the small-size board 23 and the sub-slide board 49a at the laterally opposite ends thereof (FIG. 13 showing one of these bars).

(iii. Vertically Cover Assembly)

Figure 26:
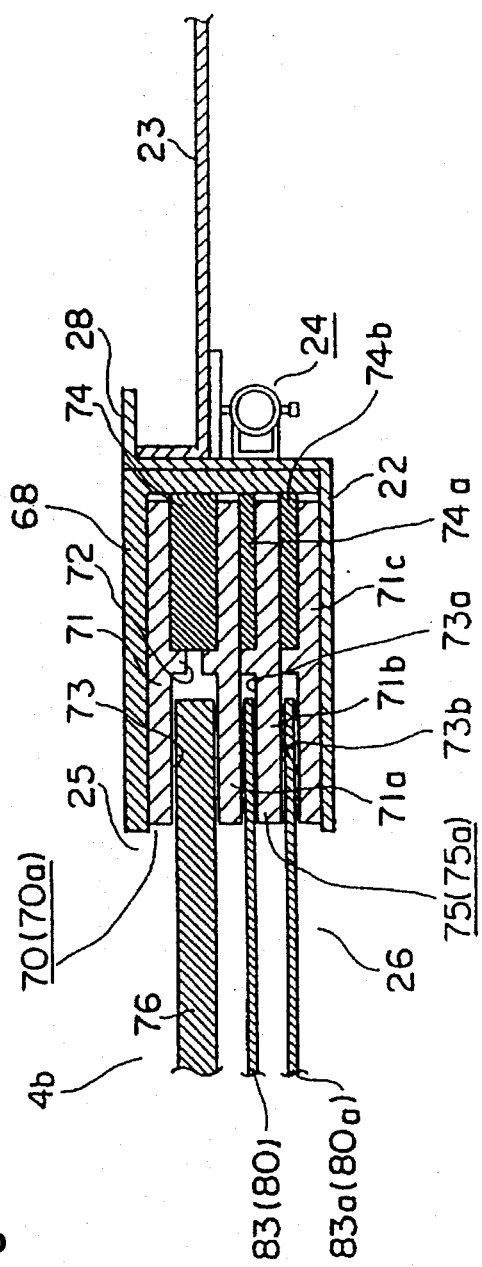
FIG. 26 is a fragmentary sectional view of a vertical guide way taken along the line A—A in FIG. 2.
Figure 27:
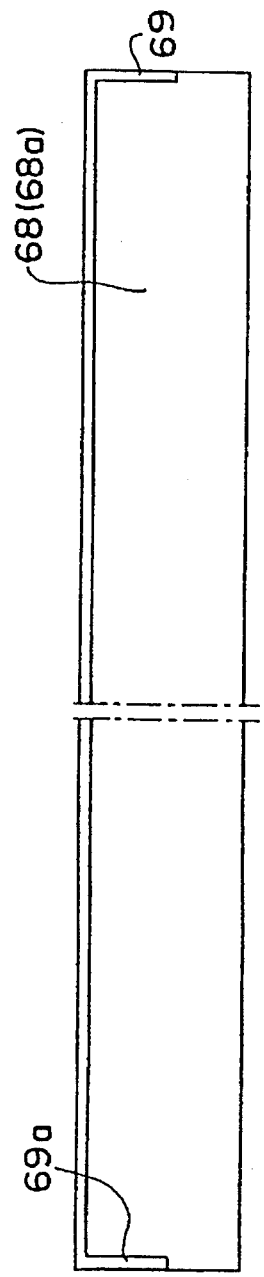
FIGS. 27 and 28 are respectively rear and lower views of a part constituting the vertical guide way.
Figure 28:
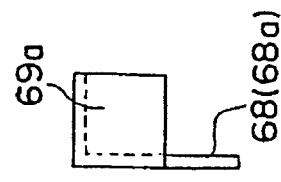

FIG. 26 shows a mechanism which is provided at the laterally opposite sides of the rectangular window 25 of the large-size board 22 for guiding a vertical cover assembly 4b, and particularly shows a part at one side of the mechanism taken along the line A—A of FIG. 2. A vertical guide member 68 which is L-shape in cross section, as shown in FIGS. 27 and 28, is fit within the rectangular depressed portion 26 at one lateral side of the large-size board 22 of the main slide board 21. The guide member 68, together with the depressed portion 26, defines a vertical guide space 70. Four guide liners 71, 71a, 71b, 71c are received within the vertical guide space 70, with themselves being spaced by three spacers 74, 74a, 74b, thereby to define three guide slots 73, 73a, 73b, and the vertical cover assembly 4b is guided by the guide slots 73, 73a, 73b. The assembly 4b comprises a center board 76 guided by the slot 73, first upper and lower boards 80, 83 guided by the slot 73a and second upper and lower boards 83, 83a guided by the slot 73b.

Figure 22:
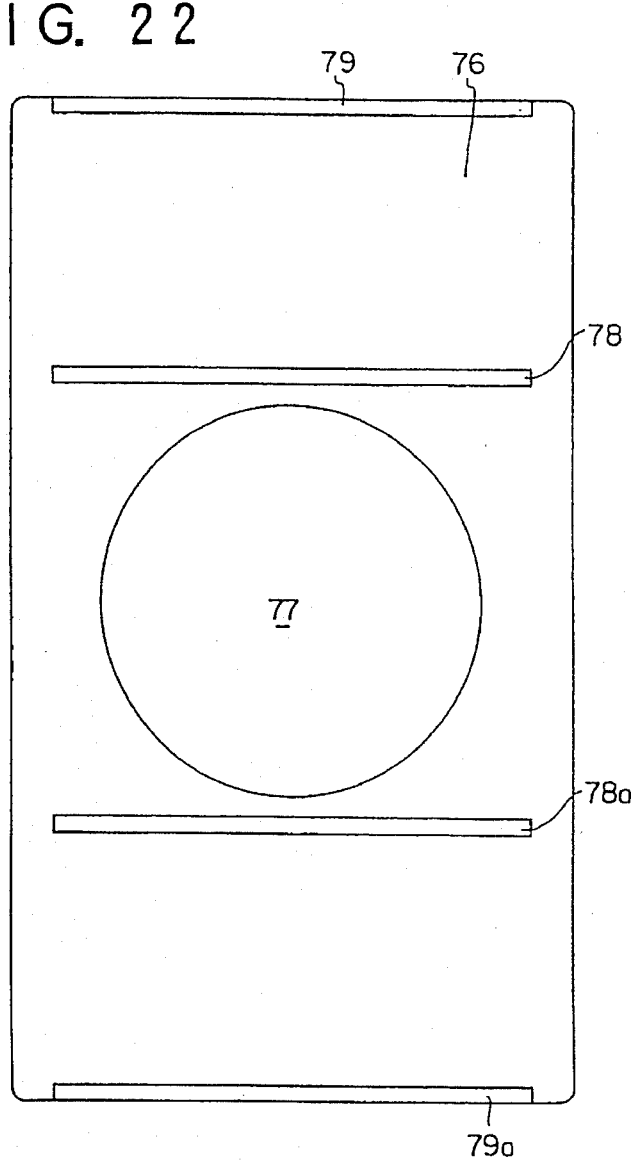
FIGS. 22 and 23 are respectively rear and side views of a center board of the apparatus.
Figure 23:
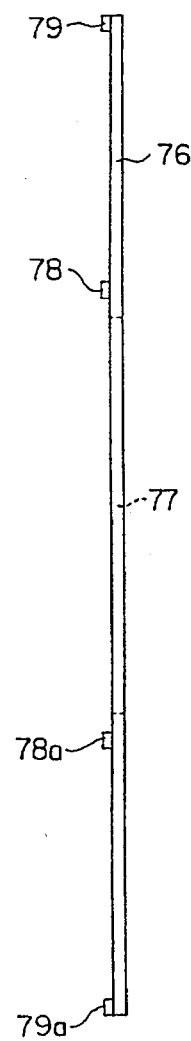

As shown in FIGS. 22 and 23, the center board 76 is formed with a tool-path hole 77 which permits a round nose portion of a spindle head 97 of the machining head unit 3. To the rear surface of the center board 76, first upper and lower hook protrusions 78, 78a are horizontally secured adjacent to the tool-path hole 77, and second upper and lower hook protrusions 79, 79a are horizontally secured along the upper and lower margins of the board 76.

Figure 25:
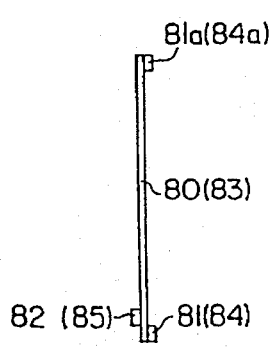
FIGS. 24 and 25 are respectively front and side view of each of upper and lower slide boards of the apparatus.
Figure 24:

The first and second upper boards 80, 80a respectively guided in the slots 73a, 73b are of the same configuration. As shown in FIGS. 24 and 25, each of these boards has secured to its rear surface two hook protrusions 81, 81a extending horizontally along the upper and lower margins of each board, and has also secured to its front surface a single stopper 82 at the position slightly higher than the lower margin of each board. The first upper board 80 is so connected or linked with the center board 76 that the stopper 82 on its front surface is located between the two upper hook protrusions 78 and 79 on the rear surface of the center board 76. The second upper board 80a is so connected or linked with the first upper board 80 that the stopper 82 thereof on its front surface is located between the two hook protrusions 81a and 81 on the rear surface of the first upper board 80. The second upper board 80a is also so linked with the main board 21 as to locate the stopper 27 of the main board 21 between the two hook protrusions 81a and 81 on the rear surface thereof. The first and second lower boards 83, 83a are arranged symmetrically with the first and second upper boards 80, 80a, and therefore, their connections or linkages with the center board and the main slide board 21 can be easily understood.

Referring back to FIGS. 1 and 3, an upper cover 86 having the same lateral width as the rear cover 58 is provided on the top of the apparatus. The cover 86 comprises a top plate portion 87, a short rear skirt portion 88, a long front skirt portion 89 and lateral plates 90, 90a. The rear skirt portion 88 is secured to an attaching plate 91 which is, in turn, secured to the frame 5, while the front skirt portion 89 is secured to the cross bar 6 whose opposite ends are held by the hook protrusions 7, 7a on the upright beams 5a, 5b. A partition plate 92 secured to the cross beam 5c is provided within the upper cover 86.

(iv. Motion Transmission Mechanism)

Description will then be made with mechanisms which are provided at the front side of the machining head unit 3 for moving the cover assemblies 4a, 4b. Referring now to FIG. 33, the machining head unit 3 comprises a cross slide table 98 slidable on the bed 1 in an X-direction in which the horizontal cover assembly 4a is movable and an access slide table 99 mounted on the cross slide table 98 to be horizontally slidable in a Y-direction perpendicular to the X-direction. The spindle head 97 is carried on a column 100 fixed on the access slide table 99 for sliding movement in a Z-direction extending vertically. The head 97 carries a tool spindle 97b rotatable about a horizontal axis parallel to the Y-direction, the spindle being adapted to receive a cutting tool.

As shown in FIGS. 2, 10 and 11, the large-size board 22 has secured at its rear-lower portions connection members 101, 101a, which are connected with the cross slide table 98. This enables the main board 21 to move together with the cross table 98 in the X-direction. A bar support 102 is provided at one lateral side of the spindle head 97, as shown in FIG. 33, and a pilot bar 103 which is received in the bar support 102 to be guided in the Y-direction is secured at its front end to the rear surface of the center slide board 76. Thus, the vertical movement of the spindle head 97 along the column 100 causes the center board 76 to move bodily therewith, which in turn causes the upper and lower slide boards 80, 80a, 83, 83a to telescopically move in connection with the vertical movement of the center board 76. The tool-path round hole 77 as viewed in FIG. 1 permits the cylindrical nose portion of the spindle head 97 to pass therethrough when the access table 99 is moved back and forth. In FIG. 33, a numeral 102a denotes a L-shape bracket, which is attached to the front surface adjacent to the cylindrical nose portion of the spindle head 97 to mount the bar support 102 bodily with the spindle head 97.

(v. Modification of Wiper Seal mechanism)

Figure 32:
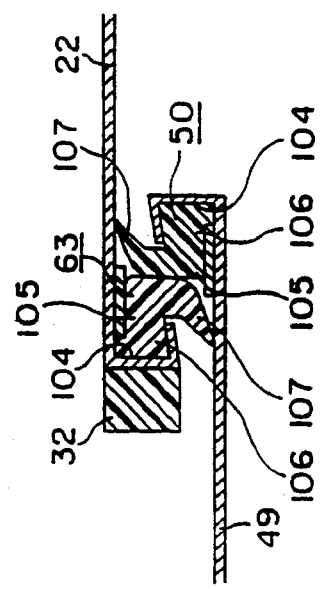
FIG. 32 is a fragmentary sectional view taken along the line C—C in FIG. 2, but showing a modified form.
Figure 31:
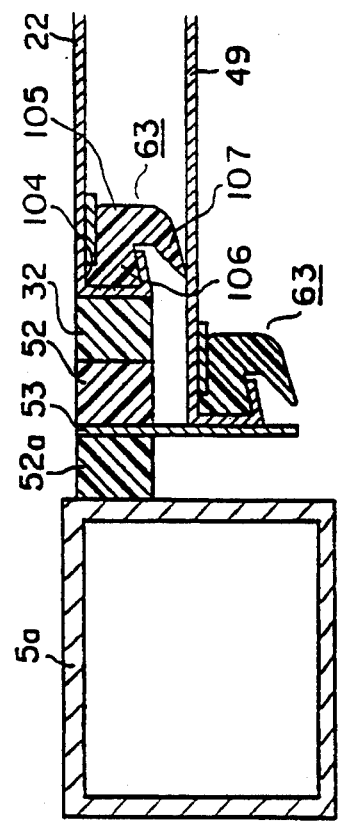
FIG. 31 is a view taken along the line B—B in FIG. 2, but showing a modified form.

The wiper seal mechanisms shown in FIGS. 29 and 30 may be modified as or substituted by those shown in FIGS. 31 and 32. In the modified or substituted wiper seal mechanisms shown in FIGS. 31 and 32, a wiper holding portion 104 of a U-shape is formed at each of laterally inner ends on the front surfaces of the sub-slide boards 49 and 49a, at each of laterally outer ends on the rear surface of the main slide board 21 and at each of the laterally outer ends of the rear surfaces of the sub-slide boards 49 and 49a. A wiper seal member 105 is fit in each of such wiper holding portions 104 and fixed therein by bending the distal end of such a U-shape wiper holding portion 104. The wiper seal member 105 made of rubber is generally a L-shape in cross section and has at its free end a lip portion which wipes out the front or rear surface of the related one of the boards 21, 49, 49a.

(vi. Second Embodiment)

Although description has been made above with the motion transmission mechanisms which use the connection members 101, 101a, the bar support 102, the bracket 102a and the pilot bar 103 for the synchronous movement of the cover assemblies 4a, 4b with the machining head unit 3, there may alternately be used another form of the mechanisms which will be described hereinunder with reference to FIGS. 36 through 38. A numeral 109 denotes a bracket which is secured to the front surface of the cross slide table 98. A vertical link bar 110 elongated in the Z-direction is upstanding on the bracket 109. As shown in FIGS. 36 and 37, a track 111 is mounted on and along the top of the cross beam 5c of the frame 5. At the upper end, the link bar 110 is vent horizontally and forwardly and is further bent from the forward end downwardly to provide a skirt margin. This skirt margin is guided in a slot of the track 111 so as to prevent the link bar 110 from inclining forwardly.

The link bar 110 is connected by a bracket 113 (FIG. 37) with the main slide board 21 of the horizontal cover assembly 4a which move laterally. Further, the link bar 110 vertically guides a slide block 115 of a well-known roller guided type. On the other hand, a bar support 116 incorporating rollers 117, 117a (FIG. 37) is fixedly mounted on the spindle head 97 of a machining head unit 3. A pilot bar 118 is inserted into the bar support 116 and is connected to the slide block 115 at its front end. Thus, the pilot bar 118 maintains the connection relation between the spindle head 97 and the slide block 115 irrespective of the back and forth movement of the machining head unit 3 in Y-direction and transmits the vertical movement of the spindle head 97a in the Z-direction to the slide block 115. An arm 119 is secured to the slide block 115, whose one end is engaged with a bracket 120 which protrudes from the center slide board 76 of the vertical cover assembly 4b, so that the center slide board 76 can be vertically moved together with the slide block 15 and hence, with the spindle head 97.

As shown in FIGS. 37 and 38, the beams constituting the frame 5 are formed by square pipes for fluid communication. An inlet port 121 is provided on the support foot beam 5d (FIG. 36) for admitting coolant therefrom into a fluid passage which is completed by the beams, while an outlet port is provided on the cross beam 5c (FIG. 37). Steel pipes 122 lead coolant from the outlet port to plural nozzles 123 which are oriented toward the working zone including a workpiece W mounted on the jig base 2.

The configuration of the vertical cover assembly 4b which include the center slide board 76 having the tool-path round hole 77, the upper slide boards 80, 80a and the lower slide boards 83, 83a is neither limited to one wherein the boards are movable within the frame 5 in the aforementioned first embodiment, nor limited to one wherein a center slide board 76 at the uppermost protrudes upwardly beyond the top of the frame 5 in this second embodiment.

In this second embodiment shown in FIGS. 36 through 38, two vertical guide ways 70, 70a similar to those shown in FIG. 26 referred to above in the first embodiment are secured on the main slide board 21. Plural vertical slide boards 130 through 133 of telescopic arrangement are vertically guided by the vertical guide ways 70, 70a.

The way of guiding the vertical slide boards 130 to 133 and the way of linking each of the boards with one adjoining thereto are basically similar to those in the aforementioned first embodiment. However, in the vertical cover assembly 4b in this second embodiment, there are not provided those corresponding to the upper slide boards 80, 80a in the first embodiment. The center board 76 which is at the upper most and which is formed with the tool-path round hole 77 for permitting the spindle head nose to pass therethrough has almost the same vertical length as the main slide board 21. Thus, when the spindle head 97a moves upwardly, the center board 76 extends its upper portion above the top of the cover frame 5, while the lower slide boards 133 to 131 telescopically extend by being lifted up in turn.

A modification may be made wherein the link bar 110 is secured to the center board 76, with itself extending horizontally and wherein the slide block 115 is connected to the main slide board 21. In this modified form, the spindle head 97 is connected to the link bar 110, while the slide block 115 is connected to the cross slide table 98. This makes it possible to move the spindle head 97 and the center slide board 76 bodily in the vertical Z-direction through the link bar 110 and also makes it possible to move the cross slide table 98 and the main slide board 21 bodily in the horizontal Y-direction through the slide block 115 running along the link bar 110.

(vii. Third Embodiment)

Description will now be made with a vertical cover assembly 4b in the third embodiment with reference to FIGS. 39 through 45.

A numeral 140 denotes a main slide board arranged at the center portion of the horizontal cover assembly 4a. The main slide board 140 is formed with a vertically elongated, rectangular window 141 at its center portion. As shown in FIGS. 40 and 44, a stopper 142 of a short length is secured to the uppermost edge portion on the rear surface of the main slide board 140, while another stopper 143 of a short length which is provided with a dumping member (not numbered) is attached to the lowermost edge portion on the rear surface of the main slide board 140. A pair of vertical guide ways, one typically shown in FIG. 41, are attached to the rear surface of the main slide board 140 respectively at laterally opposite sides of the rectangular window 141. Each of the guide ways 144 is constituted by piling up five plate 145, 145a, . . . , whose widths are gradually made wider in turn from the first plate 145 on the main slide board 140 to the fifth plate (not numbered) so as thereby to define four guide slots 146, 146a, . . . . For example, the first guide slot 146 at one lateral side is defined by the main slide board 140 and two plates 145 and 145a, and a corresponding guide slot is also provided at the other lateral side.

A first slide board 147 guided by the first guide slot 146 of the main slide board 140 has a window 148 at its center portion. Like the main slide board 140, the first slide board 147 has secured a stopper 149 of a short length to the upper end portion on its rear surface and has attached another hook protrusion 150 with a dumper function to the lower end portion on its rear surface, as shown in FIG. 43. Second and third slide boards 151, 152 which are guided by second and third slots of the main slide board 140 are of the configuration similar to the first slide board 147, but are different therefrom in their vertical lengths. As understood from FIG. 40, the second and third slide boards 151, 152 have windows 153, 154, hook protrusions 155, 156 and hook protrusions 157, 158 that respectively correspond to those 148, 149 and 150 of the first slide board 147. Of course, the windows 141, 148, 153, 154 of the boards 140, 147, 151, 152 are different in vertical length from one another in proportion to the vertical lengths of those boards.

Finally, a center slide board 159 which is guided by the fourth slot of the main slide board 140 is of a vertically elongated, rectangular shape and has at its center portion a tool-path round hole 77 for permitting the spindle head nose to pass therethrough. A lift-up protrusion 160 with a dumper function is secured to the front surface of the center slide board 159 at slightly above the round hole 77. The length through which the protrusion 160 horizontally extends from the front surface of the center slide board 159 is such that it can carry those portions of the first through third slide boards 147, 151, 152 which respectively define the upper edges of the windows 148, 153, 154 of these boards, as best shown in FIG. 40.

Operation

The operation of the slide cover apparatus as constructed above will be described hereinafter.

In a situation that the tool spindle 97a of the spindle head 97 is in axial alignment with the tool-path round hole 77 of the slide cover apparatus 4, the access slide table 99 (FIG. 33) is first advanced in the Y-direction to insert the spindle head nose into the tool-path round hole 77, and then, the cross slide table 98 and the spindle head 97 are moved respectively in the X and Z-directions, whereby a workpiece which is mounted on a work table on a jig base 2 can be machined by a cutting tool received in the tool spindle 97b.

During this machining operation, the movement of the cross slide table 98 in the X-direction is transmitted to the main slide board 21 through the brackets 101 and 101a (FIG. 2) in the first embodiment (or through the bracket 109 which connects the link bar 110 to the cross slide table 98 and the bracket 113 which connects the link bar 110 to the main slide board 21 in the second embodiment shown in FIGS. 36–38).

Thus, the main slide board 21 is moved bodily with the cross slide table 98 in the X-direction.

Also during the machining operation, the movement of the spindle head 97 in the Z-direction causes the center slide board 76 to move bodily with the spindle head 97. More specifically, in the first embodiment, the vertical movement of the spindle head 97 can be transmitted through the bar support 102 and the pilot bar 103 shown in FIG. 33. Alternatively, in the second embodiment shown in FIGS. 36–38, it can be transmitted through the bar support 116, the pilot bar 118, the slide block 115, the arm 119 and the bracket 120, wherein the slide block 115 is moved bodily with the spindle head 97 along the link bar 110 in the same direction through the bar support 116 and the pilot bar 118 and wherein the slide block 115 causes the center slide board 76 to moved bodily therewith through the arm 119 connected to the slide block 115 and the bracket 120 connecting the arm 119 to the center slide board 76.

Regarding the horizontal cover assembly 4a in the first embodiment, when the main slide board 21 is moved from the position shown in FIG. 34(b) to that shown in FIG. 34(c), the sub-slide board 49a ahead thereof gradually disappears behind the main slide board 21. After the cushion 32a provided at one lateral end of the main slide board 21 comes into abutment with the cushion 52 secured to the hook protrusion 40 of the sub-slide board 49a, the sub-slide board 49a is moved in the same direction to follow the main slide board 21, with itself being almost entirely behind the main slide board 21, while the sub-slide board 49 at the other side is brought into abutting engagement at its hook protrusion 50 with the towing bar 63 of the main slide board 21 to then follow the same.

When the main slide board 21 is moved from the position shown in FIG. 34(c) toward that shown in FIG. 34(b), to the contrary, the sub-slide board 49 ahead in the moving direction gradually disappears behind the main slide board 21. After the cushion 32 secured to one lateral end of the main slide board 21 come into abutment with the cushion 52 secured to the hook protrusion 51, the sub-slide board 49 is moved toward the same direction to follow the main board 21, with the almost entirety of itself being hidden behind the same, while the sub-slide board 49a at the other side is brought into abutting engagement at its hook protrusion 50 with the towing bar at the other side of the main slide board 21 so as to then follow the same.

While the main slide board 21 and the sub-slide boards 49, 49a are being slidden, the wiper elements 66 (FIGS. 29 and 30) provided on the rear surfaces thereof work to clear off cutting chips and dusts adhered to the front surfaces of the sub-slide boards 49, 49a and the rear cover 58. In the modification shown in FIGS. 32 and 33, clearing off cutting chips and dusts adhered to the rear surface of the main slide board 21 is also effected by the wipers 105 provided on the front surfaces of the sub-slide boards 49, 49a.

Regarding the operation of the vertical cover assembly 4b which is illustrated in FIGS. 35(a) to 35(d), when the center slide board 76 is moved upwardly from the lowermost position shown in FIG. 35(d), the upper hook protrusion 78 of the center slide board 76 comes into abutment with the stopper 82 which is provided on the lower one 80 of the two upper slide boards 80, 80a, from which position the upper slide board 80 is upwardly moved to follow the center slide board 76, with the entirety of itself being hidden behind the center slide board 76. At the same time, the hook protrusion 79a of the center slide board 76 comes into abutment with the stopper 85 which is provided on the front one 83 of the two lower slide boards 83, 83*a*, from which position the center slide board 76 is moved upwardly while lifting up the lower slide board 83.

As the center slide board 76 continues to move upwardly, the upper slide board 80*a* is moved upward in the same relation with the other slide board 80 as the slide board 80 has with the center boar 76; namely it is moved with its entirety being hidden behind the center boar 76, from which time the lower slide board 83*a* at the lowermost position is moved upward as well. Such upward movement is possible until the stopper 27 above the window 25 of the main slide board 21 comes into abutment with the hook protrusion 81 of the upper slide board 80*a* or until the hook protrusion 84*a* of the lower slide board 83*a* comes into abutment with the stopper 27*a* below the window 25 of the main slide board 21. In the situation that such upward movement reaches end as shown in FIG. 35(*a*), the upper slide boards 80, 80*a* are overlapped to be hidden behind the center slide board 76 on the upper portion of the main slide board 21, while the lower slide boards 83, 83*a* are stepwisely exposed at the window 25 of the main slide board 21.

When the center slide board 76 is moved down from the uppermost position shown in FIGS. 35(*a*), the upper slide boards 80, 80*a* and the lower slide boards 83, 83*a* are moved down to follow the center slide board 76, during which time they keep their positions relative to the center slide board 76 as they are. The upper slide board 80*a* discontinues the downwards movement when engaged at its hook protrusion 81*a* with the stopper 27 above the window 25 of the main slide board 21, while the lower slide board 83*a* discontinues the downward movement when resting at its hook protrusion 84 on the stopper 27*a* below the window 25 of the main slide board 21, as shown in FIG. 35(*b*).

Subsequently, the upper slide board 80 is stopped upon the abutment of its hook protrusion 81*a* with the stopper 82 of the upper slide board 80*a* now remaining stopped, simultaneously with which the lower slide board 83 is stopped upon the abutment of its hook protrusion 84 with the stopper 85 of the lower slide board 83*a* now remaining stopped, as shown in FIG. 35(*c*). Then, the center slide board 76 can be moved down until the hook protrusion 78*a* thereof is seated on the stopper 85 of the lower slide board 83 now remaining stopped or until the hook protrusion 79 thereof is seated on the stopper 82 of the upper slide board 80 now remaining stopped, as shown in FIG. 35(*d*). In this state, the upper slide boards 80, 80*a* are exposed stepwisely, while the lower slide boards 83, 83*a* are hidden behind the center slide board 76, with themselves being overlapped.

The center slide board 76 can be moved vertically as the main slide board 21 is moved laterally. Thus, the cover apparatus according to the present invention does not adversely affect any contouring motion of the tool spindle 97*b* within the X-Z plane which is perpendicular to the axis of the tool spindle 97*b*.

The operation of the vertical cover assembly in the second embodiment shown in FIGS. 36–38 is similar to that in the aforementioned first embodiment, and therefore, does not need be described for the sake of brevity.

Regarding the operation of the vertical cover assembly 4*b* shown in FIGS. 37 to 40 according to the third embodiment, when the center slide board 159 is moved upward bodily with the spindle head 97, the lift-up protrusion 160 thereof compulsorily moves up the third slide board 152, the second slide board 151 and the first slide board 147 in turn. In the downward movement of the center slide board 159, the first through third slide boards 147, 151, 152 move down by their own weights as they follow the lift-up protrusion 160, and discontinue their downward movements at the respective downmost positions at which they are seated on the stopper 143 and the hook protrusions 150, 157, respectively. In this third embodiment, the lower ends of the center slide board 77, the third slide board 152 and the second slide board 151 act to forcibly lower the slide covers adjoining thereto, respectively. This makes it possible for the first through third slide boards 147, 151, 152 to move reliably.

The center slide cover 159 in the third embodiment may be directly connected to the front end of such a pilot bar as indicated by the numeral 103 in FIG. 33, or may be connected to such a slide block as indicated by the numeral 115 in FIG. 36.

Obviously, numerous other modifications and variations of the present invention are possible in light of the above teachings. It is therefore to be understood that within the scope of the appended claims, the present invention may be practiced otherwise than as specifically described herein.

What is claimed is:

1. A slide cover apparatus for a machine tool having a machining head unit of the type wherein a tool spindle is movable at least in first and second mutually orthogonal directions encompassed within a plane perpendicular to the rotational axis of said tool spindle and a workpiece support unit located before said tool spindle for supporting a workpiece to be machined, said apparatus comprising:

a cover frame fixedly provided in a plane parallel to said plane, said cover frame disposed between said machining head unit and said workpiece support unit with respect to a third direction perpendicular to said plane;

a first cover assembly including a main board and plural first sub-boards telescopically movable on said cover frame in said first direction, said main board having a rectangular window extending in said second direction;

a second cover assembly including a center board and plural second sub-boards telescopically movable in said second direction for covering said rectangular window of said main board, said center board having a tool-path hole for permitting said tool spindle to pass therethrough;

first motion link means for moving said main board to follow the movement of said tool spindle in said first direction; and second motion link means for moving said center board to follow the movement of said tool spindle in said second direction;

wherein said first and second cover assemblies cooperate to partition said machining head unit from said workpiece support unit except for said tool-path hole formed on said center board.

2. A slide cover apparatus as set forth in claim 1, wherein said machining head unit includes a cross slide table horizontally movable in said first direction, a column mounted on said cross slide table, a spindle head vertically movable on said column in said second direction and carrying said tool spindle for rotation about an axis extending in said third direction, and guide means for enabling at least said tool spindle to move axially in said third direction so as to insert at least a front portion of said tool spindle into said tool-path hole of said center board, and wherein:

said first motion link means comprises at least one connection member connecting said main board of said first cover assembly integrally with said cross slide table; and said second motion link means comprises a connection member bodily connected at one end thereof to said center board of said second cover assembly and supported by said spindle head in such a manner as to transmit the movement of said spindle head in said second direction only.

3. A slide cover apparatus as set forth in claim 2, wherein said spindle head is movable relative to said cross slide table in said third direction, and wherein:

said connection member of said second motion link means comprises a pilot bar extending in said third direction; and said second motion link means further includes a bar support secured to said spindle head and receiving said pilot bar in such a manner as to enable said pilot bar to slidably move relative to said bar support in said third direction only.

4. A slide cover apparatus as set forth in claim 1, wherein said machining head unit includes a cross slide table horizontally movable in said first direction, a column mounted on said cross slide, a spindle head vertically movable on said column in said second direction and carrying said tool spindle for rotation about an axis extending in said third direction and guide means for enabling at least said tool spindle to move in said third direction so as to insert at least a front portion of said tool spindle into said tool-path hole of said center board, and wherein:

said first motion link means comprises a guide post extending in said second direction and movable bodily with said cross slide table in said first direction and a bracket connecting said guide post with said main board of said first cover assembly so as to move said main board bodily with said cross slide table in said first direction; and said second motion link means comprises a slide block slidably guided along said guide post, a bracket connecting said slide block integrally with said center board of said second cover assembly, and means for enabling said slide block to be moved integrally with said spindle head in said second direction only.

5. A slide cover apparatus as set forth in claim 4, wherein said spindle head is movable relative to said cross slide table in said third direction, and said means for enabling said slide block to be moved integrally with said spindle head comprises:

a pilot bar extending in said third direction and connected at one end thereof integrally with said slide block; and a bar support secured to said spindle head and receiving said pilot bar in such a manner that said pilot bar is movable bodily with said spindle head in said second direction but relative thereto in said third direction.

6. A slide cover apparatus as set forth in claim 1, wherein:

said center board of said second cover assembly is vertically movable in said second direction and having said tool-path hole in the vicinity of the lowermost end thereof; and said second sub-boards are provided at the lower side of said center board;

the portion above said tool-path hole of said center board is elongated so that said center board protrudes upward from the top of said cover frame when said spindle head movable in said second direction is at an uppermost position and so that said center board and said second sub-boards can partition said machining head unit from said workpiece support unit even when said spindle head is at a lowermost position.

7. A slide cover apparatus as set forth in claim 1, wherein:

said main board includes a pair of parallel guide ways extending in said second direction for vertically guiding said center board and said second sub-boards of said second cover assembly;

said second sub-boards are provided between said main board and said center board and respectively formed with vertically extending rectangular windows;

the vertical lengths of said second sub-boards are longer than that of said center board and are different such that one closer to said main board of said second sub-boards has a longer length than another closer to said center board;

the vertical lengths of said rectangular windows of said second sub-boards are different such that one closer to said main board of said second sub-boards has a longer length than another closer to said center board; and said second cover assembly further includes means for telescopically moving said second sub-boards in connection with the vertical movement of said center board.

8. A slide cover apparatus as set forth in claim 7, wherein said means for telescopically moving said second sub-boards comprises:

a lift-up member horizontally protruding from one surface facing said main board for lifting up said second sub-boards through engagements with upper ends of said rectangular windows of said second sub-boards; and stoppers for limiting the lowermost ends of said second sub-boards.

9. A slide cover apparatus as set forth in claim 8, wherein said stoppers are provided respectively on the lower end portions of said main board and said sub-slide boards.

10. A slide cover apparatus as set forth in claim 1, wherein said cover frame is formed with a fluid inlet port at its lower portion and a fluid outlet port at its upper portion and is made of a pipe member to form a fluid path communicating with said inlet and outlet ports.

11. A slide cover apparatus for a machine tool having a machining head unit including a cross slide table horizontally movable in a first direction, a spindle head vertically movable in a second direction and carrying a tool spindle rotatable about an axis horizontally extending in a third direction perpendicular to said first and second directions and a column movable on said third direction and vertically guiding said spindle head, and a workpiece support unit located before said tool spindle for supporting a workpiece to be machined, said apparatus comprising:

a cover frame fixedly provided parallel to said first and second directions, said cover frame disposed between said machine head unit and said workpiece support with respect to said third direction;

a first cover assembly including a main board and plural first sub-boards guided by said cover frame to be slidable telescopically in said first direction, said main board having a vertically extending rectangular window;

a second cover assembly including a center board and plural second sub-boards guided by said main board to be slidable telescopically in said second direction for covering said rectangular window of said main board, said center board having a tool-path hole for permitting said tool spindle to pass therethrough;

first motion link means for moving said main board to follow the horizontal movement of said cross slide table; and second motion link means for moving said center board to follow the vertical movement of said spindle head;

wherein said first and second cover assemblies cooperate to partition said machining head unit from said workpiece support unit except for said tool-path hole formed on said center board.

12. A slide cover apparatus as set forth in claim 11, wherein said second motion link means comprises:

a pilot bar horizontally extending in said third direction and connected at one end thereof to said center board; and a bar support secured to said spindle head and receiving said pilot bar in such a manner as to enable said pilot bar to slidably move relative to said bar support in said third direction only.

13. A slide cover apparatus as set forth in claim 11, wherein:

said first motion link means comprises a guide post extending in said second direction and movable bodily with said cross slide table in said first direction and a bracket connecting said guide post with said main board of said first cover assembly so as to move said main board bodily with said cross slide table in said first direction; and said second motion link means comprises a slide block slidably guided along said guide post, a bracket connecting said slide block integrally with said center board of said second cover assembly, and means for enabling said slide block to be moved integrally with said spindle head in said second direction only.

14. A slide cover apparatus as set forth in claim 13, wherein said means for enabling said slide block to be moved integrally with said spindle head comprises:

a pilot bar extending in said third direction and connected with at one end thereof integrally with said slide block; and a bar support secured to said spindle head and receiving said pilot bar in such a manner that said pilot bar is movable bodily with said spindle head in said second direction but relative thereto in said third direction.

15. A slide cover apparatus as set forth in claim 11, wherein:

said center board of said second cover assembly has said tool-path hole in the vicinity of the lowermost end thereof; and said second sub-boards are provided at only the lower side of said center board;

the portion above said tool-path hole of said center board is elongated so that said center board protrudes upward from the top of said cover frame when said spindle head movable in said second direction is at an uppermost position and so that said center board and said second sub-boards can partition said machining head unit from said workpiece support unit even when said spindle head is at a lowermost position.

16. A slide cover apparatus as set forth in claim 11, wherein:

said main board includes a pair of parallel guide ways extending in said second direction for vertically guiding said center board and said second sub-boards of said second cover assembly;

said second sub-boards are provided between said main board and said center board and respectively formed with vertically extending rectangular windows;

the vertical lengths of said second sub-boards are longer than that of said center board and are different such that one closer to said main board of said second sub-boards has a longer length than another closer to said center board;

the vertical lengths of said rectangular windows of said second sub-boards are different such that one closer to said main board of said second sub-boards has a longer length than another closer to said center board; and said second cover assembly further includes means for telescopically moving said second sub-boards in connection with the vertical movement of said center board.

17. A slide cover apparatus as set forth in claim 16, wherein said means for telescopically moving said second sub-boards comprises:

a lift-up member horizontally protruding from one surface thereof facing said main board for lifting up said second sub-boards through engagements with upper ends of said rectangular windows of said second sub-boards; and stoppers provided respectively on the lower end portions of said main board and said sub-slide boards for limiting the lowermost ends of said second sub-boards.

18. A slide cover apparatus as set forth in claim 11, wherein said cover frame is formed with a fluid inlet port and a fluid outlet port and is made of a pipe member to form a fluid path therein communicating said inlet and outlet ports.

19. A slide cover apparatus for a machine tool having a machining head unit of the type wherein a tool spindle is movable at least in first and second mutually orthogonal directions encompassed within a plane perpendicular to the rotational axis of said tool spindle and a workpiece support unit located before said tool spindle for supporting a workpiece to be machined, said apparatus comprising:

at least one cover assembly provided in a plane parallel to said plane, said at least one cover assembly disposed between said machining head unit and said workpiece support unit with respect to a third direction perpendicular to said plane for partitioning said machining head unit from said workpiece support unit, said at least one cover assembly including;

first and second boards movable in a single direction encompassed within said plane, one of said first and second boards being movable by said machining head unit; and cover link means provided in said cover assembly for telescopically moving the other of said first and second boards in connection with the movement of said one of said first and second boards and including first hook member provided at at least one end in said single direction of said first board and extending toward said second board, a second hook member provided at at least the other end in said single direction of said second board and extending toward said first board; and a sealing element provided on one of said first and second boards and having a lip portion which is elastically urged on a surface of the other of said first and second boards, said sealing element also having a cushion portion which is engageable with one of said hook members provided on other of said first and second boards for towing said the other of said first and second boards.

20. A slide cover apparatus for a machine tool having a machining head unit of the type wherein a tool spindle is movable at least in first and second mutually orthogonal directions encompassed within a plane perpendicular to the rotational axis of said tool spindle and a workpiece support unit located before said tool spindle for supporting a workpiece to be machined, said apparatus comprising:

a cover frame fixedly provided in a plane parallel to said plane, said cover frame disposed between said machining head unit and said workpiece support unit with respect to a third direction perpendicular to said plane;

first cover means including a main board and two first cover assemblies movable on said cover frame in said first direction, said main board having a window extending in said second direction, and said two first cover assemblies expansible in said first direction being arranged at each side of said main board with respect to said first direction;

second cover means mounted on said first cover means including a center board and two second cover assemblies movable in said second direction for covering said window of said main board, said center board having a tool-path hole for permitting said tool spindle to pass therethrough, and said two second cover assemblies expansible in said second direction being arranged at each side of said center board with respect to said second direction; and motion link means connected to said center board of said second cover means for moving said first and second cover means to follow the movement of said tool spindle in said first and second mutually orthogonal directions;

wherein said first and second cover means cooperate to partition said machining head unit from said workpiece support unit except for said tool-path hole formed on said center board.

21. A slide cover apparatus as set forth in claim 20, further comprising:

motion sub-link means connected to said first cover means for moving said first cover means to follow the movement of said tool spindle in said first direction.

22. A slide cover apparatus as set forth in claim 20, wherein each of said second cover assemblies is constituted of plural sub-boards telescopically movable in said second direction.

* * * * *